US011704839B2

(12) United States Patent
Kim et al.

(10) Patent No.: US 11,704,839 B2
(45) Date of Patent: Jul. 18, 2023

(54) MULTIVIEW VIDEO ENCODING AND DECODING METHOD

(71) Applicant: Electronics and Telecommunications Research Institute, Daejeon (KR)

(72) Inventors: Soo Woong Kim, Sejong-si (KR); Jung Won Kang, Daejeon (KR); Gun Bang, Daejeon (KR); Jin Ho Lee, Daejeon (KR); Ha Hyun Lee, Seoul (KR); Sung Chang Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 40 days.

(21) Appl. No.: 17/124,226

(22) Filed: Dec. 16, 2020

(65) Prior Publication Data

US 2021/0233282 A1 Jul. 29, 2021

(30) Foreign Application Priority Data

Dec. 17, 2019 (KR) .................. 10-2019-0168783
Dec. 31, 2019 (KR) .................. 10-2019-0179057
Dec. 16, 2020 (KR) .................. 10-2020-0176820

(51) Int. Cl.
  *G06T 9/00* (2006.01)
  *G06T 15/20* (2011.01)
  (Continued)

(52) U.S. Cl.
  CPC .............. *G06T 9/001* (2013.01); *G06T 15/04* (2013.01); *G06T 15/205* (2013.01); *G06T 17/20* (2013.01)

(58) Field of Classification Search
  CPC ....... G06T 9/001; G06T 15/04; G06T 15/205; G06T 17/20; G06T 7/97; G06T 9/00;
  (Continued)

(56) References Cited

U.S. PATENT DOCUMENTS 7,456,831 B2  11/2008  Chu et al.
8,922,547 B2  12/2014  Lim et al.
(Continued)

FOREIGN PATENT DOCUMENTS

KR  1020140010708 A  1/2014
KR  1020160004946 A  1/2016
KR    101654777 B1   9/2016

*Primary Examiner* — Michael Le
(74) *Attorney, Agent, or Firm* — William Park & Associates Ltd.

(57) ABSTRACT

The present disclosure provides a multi-view image decoding method including: obtaining, from a bitstream, three-dimensional geometry information indicating a three-dimensional space of a multi-view image, view independent component information indicating a view independent component, which is uniformly applied to every view, and view dependent component information indicating a view dependent component, which is differently applied according to views; determining a view dependent component for a texture map of a current view from the view dependent component information; generating the texture map of the current view from a view independent component of the view independent component information and the determined view dependent component for the current view; and reconstructing a current view image according to a three-dimensional space that is constructed according to the texture map of the current view and the three-dimensional geometry information.

13 Claims, 29 Drawing Sheets

(51) Int. Cl.
*G06T 15/04* (2011.01)
*G06T 17/20* (2006.01)

(58) Field of Classification Search
CPC .... G01B 11/245; H04N 5/247; H04N 19/597; H04N 13/161
See application file for complete search history.

(56) References Cited

U.S. PATENT DOCUMENTS

| | | |
|---|---|---|
| 9,924,180 B2 | 3/2018 | Lee et al. |
| 10,194,133 B2 | 1/2019 | Bang et al. |
| 10,339,716 B1* | 7/2019 | Powers ................. G06T 7/85 |
| 10,389,994 B2 | 8/2019 | Graziosi |
| 10,552,987 B2 | 2/2020 | Laroche et al. |
| 10,872,457 B1* | 12/2020 | Hu ...................... G06T 15/506 |
| 2006/0017722 A1* | 1/2006 | Hong ..................... G06T 15/04 |
| | | 345/582 |
| 2007/0262983 A1* | 11/2007 | Choi ...................... G06T 17/00 |
| | | 345/420 |
| 2010/0156901 A1* | 6/2010 | Park .................... G06T 15/205 |
| | | 345/420 |
| 2016/0330467 A1* | 11/2016 | Park ...................... H04N 19/70 |
| 2016/0373784 A1* | 12/2016 | Bang ..................... H04N 19/70 |
| 2017/0358126 A1* | 12/2017 | Lim ..................... G06T 3/0018 |
| 2018/0061086 A1* | 3/2018 | Yoshimura ................ G06T 5/50 |
| 2018/0158230 A1* | 6/2018 | Yan .................... G06V 10/7557 |
| 2018/0253867 A1* | 9/2018 | Laroche ................. G06T 17/20 |
| 2019/0213772 A1* | 7/2019 | Lombardi ............... G06T 15/04 |
| 2020/0296350 A1* | 9/2020 | Oh ....................... H04N 13/161 |
| 2021/0209845 A1* | 7/2021 | Shepherd ................ G06T 17/20 |

* cited by examiner

FIG. 4

| | Triangular mesh model structure | | | | | |
|---|---|---|---|---|---|---|
| Total number of vertex datasets | $N_v$ | | | | | |
| Total number of connectivity datasets | $N_c$ | | | | | |
| List of vertex information $V=\{v_0, v_1, \ldots, v_{N_v-1}\}$ | Position of Vertex X | Position of Vertex Y | Position of Vertex Z | Position of Texture Map u | Position of Texture Map v | |
| | $X_0$ | $Y_0$ | $Z_0$ | $u_0$ | $v_0$ | |
| | $X_1$ | $Y_1$ | $Z_1$ | $u_1$ | $v_1$ | |
| | $\vdots$ | $\vdots$ | $\vdots$ | $\vdots$ | $\vdots$ | |
| | $X_{N_v-1}$ | $Y_{N_v-1}$ | $Z_{N_v-1}$ | $u_{N_v-1}$ | $v_{N_v-1}$ | |
| List of connectivity information $C=\{c_0, c_1, \ldots, c_{N_c-1}\}$ | List of index of connected vertexes | | | | | |
| | $(index_v) \in c_0$ | | | | | |
| | $(index_v) \in c_1$ | | | | | |
| | $\vdots$ | | | | | |
| | $(index_v) \in c_{N_c-1}$ | | | | | |

$index_v$ : index number of vertex information v
Indexes of vertexes are numbered by integers in ascending order from 0

Multi-view image → Mesh model (three-dimensional reconstruction) → UV texture coordinate (mesh parameterization) → Multi-view texture map FIG. 12
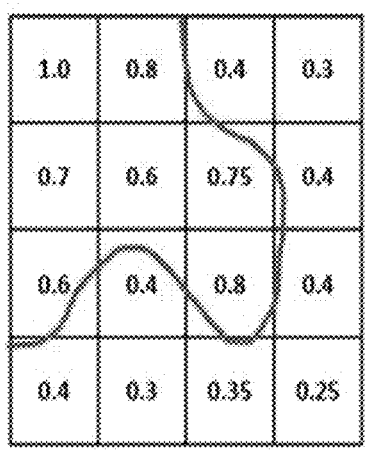
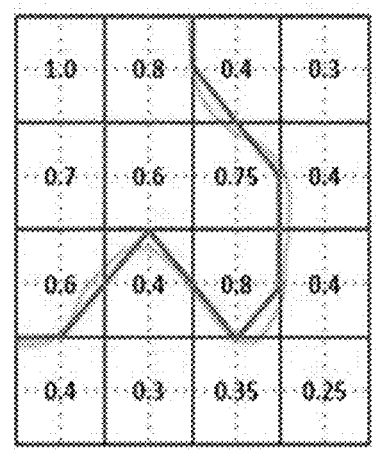

FIG. 36

| Items | Description |
|---|---|
| Grid size | Number of voxels at x, y and z axes $N_g \times M_g \times H_g$ |
| Voxel size | Voxel sizes at x, y and z axes $N_v \times M_v \times H_v$ |
| Triangulation index | $N_g * M_g * H_g$ integer sequences between 0 and 255 |
| 14 sets of texture space information for each triangulation pattern (from Pattern 1 to Pattern 14) | Number of eigenvectors L |
| | Eigenvector constituting texture space $E=[e_1, e_2, \ldots, e_L]$ |
| | Average UV patch vector $t_u$ |
| | Size of UV patch $N_t \times M_t$ |
| Texture spatial coordinate | $N_g * M_g * H_g$ sequences of texture spatial coordinate $\omega_i$ |

MULTIVIEW VIDEO ENCODING AND DECODING METHOD

TECHNICAL FIELD

The present disclosure relates to a method and apparatus for encoding and rendering based on view dependent/independent component separation of a multi-view image. More particularly, the present disclosure relates to a method and apparatus for performing encoding and rendering of a multi-view image by separating view dependent/independent components of the multi-view image and removing an overlapping component between images.

BACKGROUND ART

Taken by a rig where a plurality of cameras is placed a predetermined distance apart and in a predetermined direction, a multi-view image may provide an image with multiple views and enable a viewer to experience natural motion parallax. However, one disadvantage of such a multi-view image is that an enormous amount of image data for multiple views should be stored.

As the interest in tangible contents explosively increases and broadcasting equipment and image transmission technology are being advanced in recent years, the multimedia industry including film or TV is trying to utilize tangible contents more actively than ever.

One of the methods for representing tangible data is to utilize multi-view plus depth (MVD) data. MVD data are data that obtain an image of a specific view and depth information utilizing a plurality of cameras placed at short intervals. MVD data are widely used as materials to represent tangible contents since they make modeling possible by utilizing position information of a camera at a capture view as well as color information and depth information of an image and geometrically reconstructing and fusing the image. As the number of captured views increases, MVD data may generate a higher-quality 3D content. Nevertheless, the number of additional images to be transmitted also increases, which may result in a problem with transmission bandwidth. In addition, a multi-view high-quality image demands a large storage space.

DISCLOSURE

Technical Problem

A technical object of the present disclosure is to provide a method and apparatus for separating a (camera) view dependent/independent attribute and removing redundant data for efficient encoding of a multi-view image.

Another technical object of the present disclosure is to provide a method and apparatus in which a separated view dependent/independent attribute may be utilized not only to reconstruct an original view image but also to generate a viewer's view (not present in original data) image.

The technical objects of the present disclosure are not limited to the above-mentioned technical objects, and other technical objects that are not mentioned will be clearly understood by those skilled in the art through the following descriptions.

Technical Solution

The present disclosure provides a multi-view image decoding method including: obtaining, from a bitstream, three-dimensional geometry information indicating a three-dimensional space of a multi-view image, view independent component information indicating a view independent component, which is uniformly applied to every view, and view dependent component information indicating a view dependent component, which is differently applied according to views; determining a view dependent component for a texture map of a current view from the view dependent component information; generating the texture map of the current view from a view independent component of the view independent component information and the determined view dependent component for the current view; and reconstructing a current view image according to a three-dimensional space that is constructed according to the texture map of the current view and the three-dimensional geometry information.

According to an embodiment, the three-dimensional geometry information may indicate a triangular mesh structure representing a three-dimensional space.

According to an embodiment, the three-dimensional geometry information may include at least one of vertex position information indicating three-dimensional positions of vertexes of a triangular mesh, connectivity information indicating geometric connection between the vertexes of the triangular mesh, and texture map position information indicating a two-dimensional position corresponding to a vertex of the triangular mesh.

According to an embodiment, the triangular mesh structure may be determined in voxel units of the three-dimensional space, and a triangular mesh structure for a voxel may be determined as one of a plurality of preset triangular structure patterns.

According to an embodiment, the view dependent component information may include a view dependent component of a texture map for a plurality of captured view images.

According to an embodiment, the determining of the view dependent component for the current view from the view dependent component information may include: calculating a weight of the plurality of captured view images according to the current view; calculating a weighted average of view dependent components of a texture map for the plurality of captured view images according to the weight of the plurality of captured view images; and determining a view dependent component of a texture map for the current view according to the calculated weighted average.

According to an embodiment, the calculating of the weight of the plurality of the captured view images according to the current view may determine the weight according to a view angle difference and a view position difference between the current view and the plurality of captured view images.

According to an embodiment, the view independent component may be determined from an average texture map of a texture map for the plurality of captured view images, and a view dependent component of a texture map for the plurality of captured view images may be determined according to a difference value between a texture map for the plurality of captured view images and the view independent component.

According to an embodiment, the multi-view image decoding method may further include obtaining current view information for the current view. The current view information may include the position information, rotation information, focus information and center pixel coordinate information of the current view.

According to an embodiment, the reconstructing of the current view image may include: matching a two-dimensional coordinate of a texture map of the current view and a three-dimensional coordinate of the three-dimensional space according to the current view information; and reconstructing the current view image from the texture map of the current view according to the matched relation between the two-dimensional coordinate and the three-dimensional coordinate.

The present disclosure provides a multi-view image encoding method including: from a plurality of captured view images constituting a multi-view image, generating three-dimensional geometry information indicating a three-dimensional space of the multi-view image; generating a texture map of the plurality of captured view images constituting the multi-view image; from the texture map of the plurality of captured view images, obtaining view independent component information indicating a view independent component, which is uniformly applied to every view, and view dependent component information indicating a view dependent component, which is differently applied according to views; and generating a bitstream including the three-dimensional geometry information, the view independent component information and the view dependent component information.

According to an embodiment, the three-dimensional geometry information may indicate a triangular mesh structure representing a three-dimensional space.

According to an embodiment, the three-dimensional geometry information may include at least one of vertex position information indicating three-dimensional positions of vertexes of a triangular mesh, connectivity information indicating geometric connection between the vertexes of the triangular mesh, and texture map position information indicating a two-dimensional position corresponding to a vertex of the triangular mesh.

According to an embodiment, the triangular mesh structure may be determined in voxel units of the three-dimensional space, and a triangular mesh structure for a voxel may be determined as one of a plurality of preset triangular structure patterns.

According to an embodiment, the view dependent component information may include a view dependent component of a texture map for a plurality of captured view images.

According to an embodiment, the view independent component may be determined from an average texture map of a texture map for the plurality of captured view images, and a view dependent component of a texture map for the plurality of captured view images may be determined according to a difference value between a texture map for the plurality of captured view images and the view independent component.

According to an embodiment, the generating of the texture map of the plurality of captured view images constituting the multi-view image may further include obtaining capture view information of the plurality of captured view images, and the capture view information may include the position information, rotation information, focus information and center pixel coordinate information of the captured view images.

According to an embodiment, the generating of the texture map of the plurality of captured view images constituting the multi-view image may include: matching a two-dimensional coordinate of the texture map of the captured view images and a three-dimensional coordinate of the three-dimensional space according to the capture view information; and generating the texture map of the plurality of captured view images from the plurality of captured view images according to the matched relation between the two-dimensional coordinate and the three-dimensional coordinate.

The present disclosure provides a computer-readable recording medium for storing a bitstream including coded data of a multi-view image that is encoded according to a multi-view image encoding method. The multi-view image encoding method includes: from a plurality of captured view images constituting a multi-view image, generating three-dimensional geometry information indicating a three-dimensional space of the multi-view image; generating a texture map of the plurality of captured view images constituting the multi-view image; from the texture map of the plurality of captured view images, obtaining view independent component information indicating a view independent component, which is uniformly applied to every view, and view dependent component information indicating a view dependent component, which is differently applied according to views; and generating a bitstream including the three-dimensional geometry information, the view independent component information and the view dependent component information.

The features briefly summarized above with respect to the present disclosure are merely exemplary aspects of the detailed description below of the present disclosure, and do not limit the scope of the present disclosure.

Advantageous Effects

According to the present disclosure, a method and apparatus for encoding and rendering based on view dependent/independent component separation of a multi-view image may be provided.

In addition, according to the present disclosure, an image conversion method may be provided which minimizes the loss of color information by utilizing view dependent/independent components generated from a multi-view image and conveniently expresses the components in encoding.

In addition, according to the present disclosure, not only an original view image but also a 2D image of a view not present in original data may be reconstructed by combining view dependent components.

Effects obtained in the present disclosure are not limited to the above-mentioned effects, and other effects not mentioned above may be clearly understood by those skilled in the art from the following description.

DESCRIPTION OF DRAWINGS

FIG. 4 is a view showing the structure of a triangular mesh model according to an embodiment of the present disclosure.

FIG. 12 is a view showing a two-dimensional marching square algorithm with 4×4 volume data according to an embodiment of the present disclosure.

FIG. 36 shows a data list for storing geometry information and texture information according to an embodiment of the present disclosure.

MODE FOR INVENTION

Figure 1:
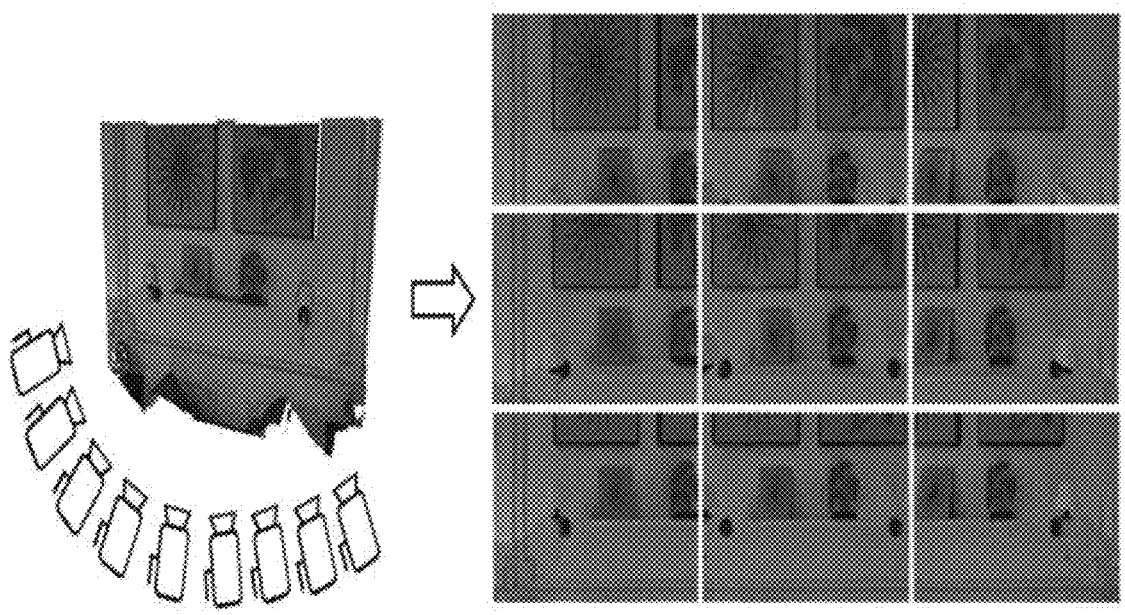
FIG. 1 is a view illustrating an example of multi-view image according to an embodiment of the present disclosure.

Hereinafter, embodiments of the present disclosure will be described in detail with reference to the accompanying drawings, which will be easily implemented by those skilled in the art. However, the present disclosure may be embodied in many different forms and is not limited to the embodiments described herein.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

A variety of modifications may be made to the present disclosure and there are various embodiments of the present disclosure, examples of which will now be provided with reference to drawings and described in detail. However, the present disclosure is not limited thereto, although the exemplary embodiments can be construed as including all modifications, equivalents, or substitutes in a technical concept and a technical scope of the present disclosure. The similar reference numerals refer to the same or similar functions in various aspects. In the drawings, the shapes and dimensions of elements may be exaggerated for clarity. In the following detailed description for exemplary embodiments, references are made to the accompanying drawings that show, by way of illustration, specific embodiments. These embodiments are described in sufficient detail to enable those skilled in the art to implement the embodiments. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the embodiment. The following detailed description is, therefore, not to be taken in a limiting sense, and the scope of the exemplary embodiments is defined only by the appended claims, appropriately interpreted, along with the full range of equivalents to what the claims claim.

In the present disclosure, the terms such as first and second are used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

Furthermore, constitutional parts shown in the embodiments of the present disclosure are independently shown so as to represent characteristic functions different from each other. Thus, it does not mean that each constitutional part is a constitutional unit of separated hardware or software. In other words, each constitutional part includes each of enumerated constitutional parts for better understanding and ease of description. Thus, at least two constitutional parts of each constitutional part may be combined to form one constitutional part or one constitutional part may be divided into a plurality of constitutional parts to perform each function. Both an embodiment where each constitutional part is combined and another embodiment where one constitutional part is divided are also included in the scope of the present disclosure, if not departing from the essence of the present disclosure.

The terms used in the present disclosure are merely used to describe particular embodiments, while not being intended to limit the present disclosure. Singular expressions include plural expressions unless the context clearly indicates otherwise. In the present disclosure, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific configuration is referred to as being "included", other configurations than the configuration are not excluded, but additional elements may be included in the embodiments of the present disclosure or the technical scope of the present disclosure.

In addition, some of constituents may not be indispensable constituents performing essential functions of the present disclosure but be selective constituents improving only performance thereof. The present disclosure may be implemented by including only the indispensable constitutional parts for realizing the essence of the present disclosure except other constituents used merely for improving performance. A structure including only the indispensable constituents except the selective constituents used only for improving performance is also included in the scope of right of the present disclosure.

Hereinafter, the embodiments of the present disclosure will be described with reference to the accompanying drawings.

FIG. 1 is a view illustrating an example of multi-view image according to an embodiment of the present disclosure.

A multi-view image consists of images that are taken simultaneously by a plurality of cameras having different views for a specific region. A multi-view image provides an image adaptive to a viewer's change in view. Accordingly, in virtue of a multi-view image, a viewer may have a three-dimensional feeling as motion parallax is represented. When a multi-view image is obtained by arraying cameras at close intervals for a large region, a free change of view and a smooth motion parallax representation may be provided to a viewer. However, an amount of image data may significantly increase in proportion to the number of views. Accordingly, in order to serve video contents by means of a multi-view image, an encoding method is required which may minimize an increase of data volume according to an increase in the number of views.

Accordingly, the present disclosure suggests a view dependent/independent component decomposition and encoding system that may efficiently remove data redundancy between each view image for encoding a multi-view image. In addition, the present disclosure suggests a method of rendering an image of a user's view by using a view dependent/independent component.

Figure 2:
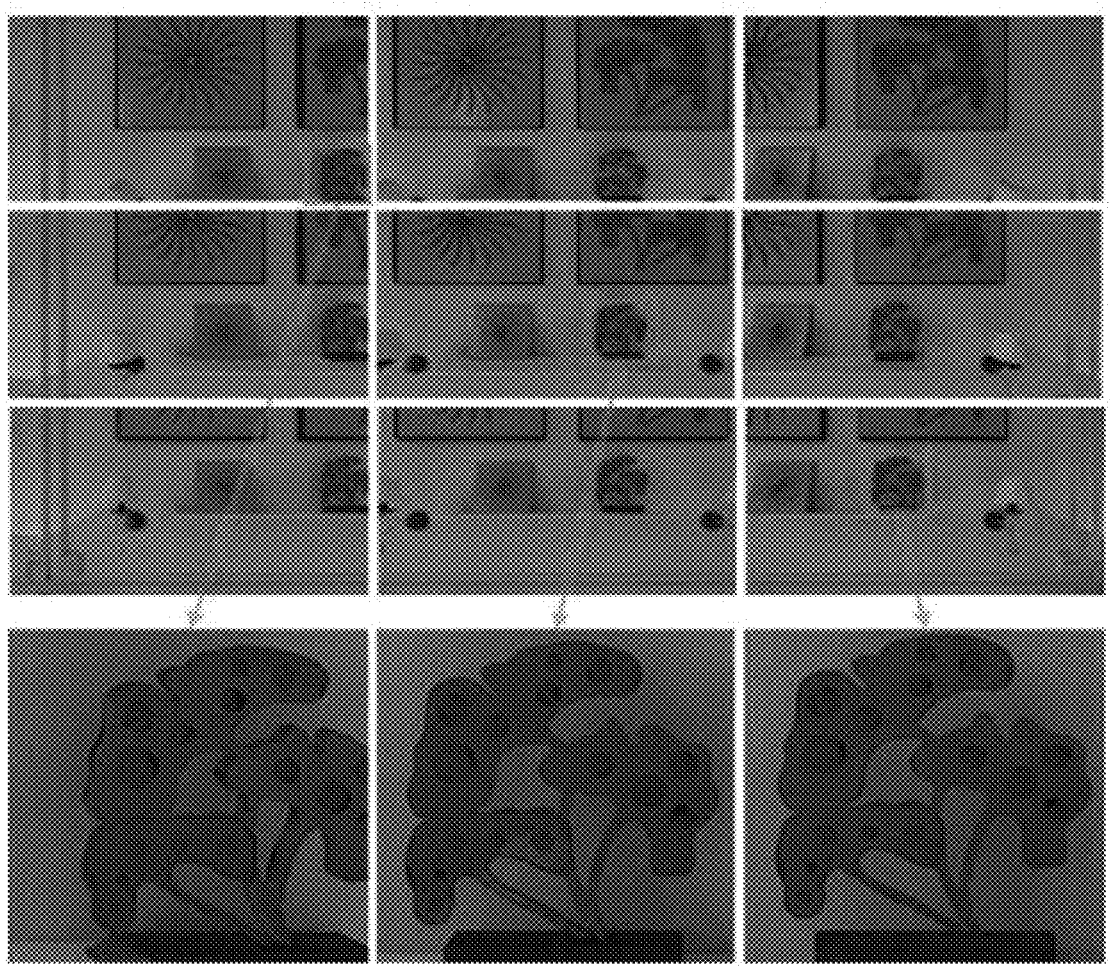
FIG. 2 is a view illustrating an object that has different colors due to a view change of a camera, according to an embodiment of the present disclosure.

FIG. 2 is a view illustrating an object that has different colors due to a view change of a camera, according to an embodiment of the present disclosure.

In a multi-view image, spatial redundancy is high between adjacent view images. However, even when spatial redundancy is high, as illustrated in FIG. 2, each view image may have a different color of object because of factors like parallax of cameras, placement of a subject, and a surface feature. For example, depending on a position of view, a scene of being reflected from a mirror, a figure of shadow, or light reflected from metal may have a different feature.

In the present disclosure, each view image may be expressed by distinguishing a view dependent component (mainly specular reflection) showing reflected light only at a specific view and a view independent component (mainly diffuse reflection) showing reflected light at every view.

Equation (1) below expresses an image as a sum of view dependent/independent components. In Equation (1), $\theta_k$ represents k-th view information (the position, rotation and calibration information of a camera) of a multi-view image. In addition, $I(\theta_k)$ represents an image obtained at view $\theta_k$. $I^{ind}I^{ind}$ represents an independent component that is not affected by a view. In addition, $I^{dep}(\theta_k)$ represents a dependent component that is affected by view $\theta_k$.

$$I(\theta_k)=I^{ind}+I^{dep}(\theta_k) \quad \text{Equation (1)}$$

A view independent component may be applied to every view of a multi-view image irrespective of views. Since a view dependent component is affected by a view, it has a different value at each view of a multi-view image. As most things except luminous bodies diffusely reflect light, view independent components have high redundancy between each view image. Accordingly, when it is possible to separate a view dependent component and a view independent component, redundant information between each view image of a multi-view image may be removed, thereby realizing efficient encoding. However, as a single point in three dimensions is projected into different pixel coordinates in each Diep view image, it is difficult to separate view dependent/independent components by analyzing spatial redundancy on a two-dimensional image coordinate.

Figure 3:
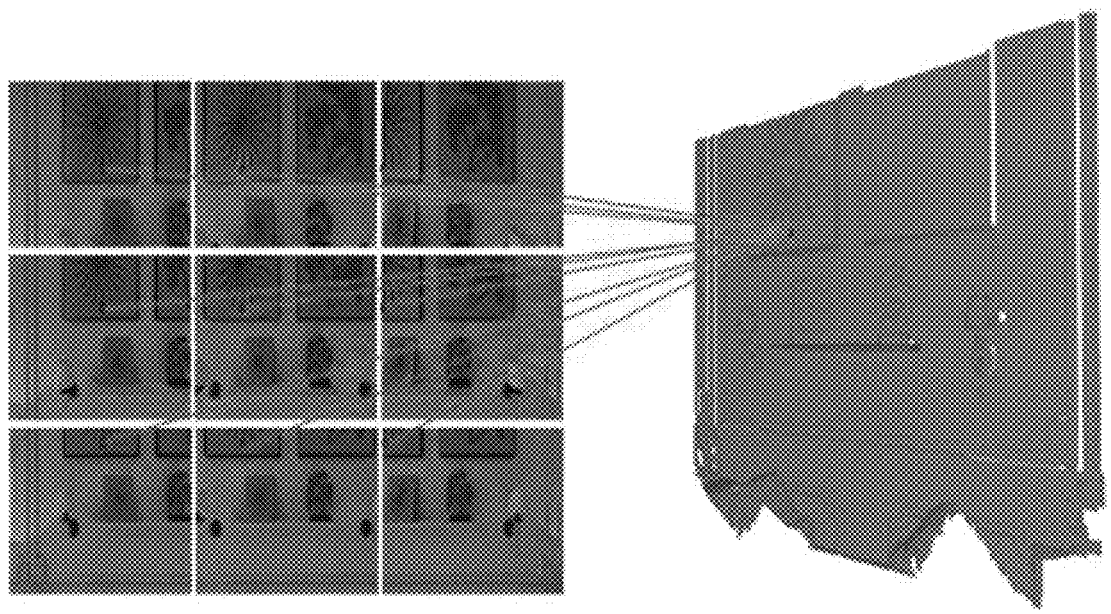
FIG. 3 is a view illustrating three-dimensional transformation of a multi-view image according to an embodiment of the present disclosure.

FIG. 3 is a view illustrating three-dimensional transformation of a multi-view image according to an embodiment of the present disclosure.

Color values of each view image need to be compared in order to predict view dependent/independent components. As a single point in a three-dimensional space is mapped to a different pixel position in each view image, it is not possible to compare the single point of the three-dimensional space at a same pixel position in a two-dimensional space. When a pixel coordinate of each view is transformed into a three-dimensional coordinate through three-dimensional reconstruction of a multi-view image, it is possible to collect a color value mapped to each image at one point in a same space. View dependent/independent components may be separated by collecting image components that are at different pixel coordinates but are projected to a same three-dimensional spatial coordinate.

FIG. 4 is a view showing the structure of a triangular mesh model according to an embodiment of the present disclosure.

The present disclosure uses a triangular mesh structure to store three-dimensional geometry information of a multi-view image. A triangular mesh structure used in the present disclosure may consist of (1) geometry information indicating the three-dimensional position of each vertex, (2) connectivity information representing a triangle through geometrical connection of vertexes, and (3) a coordinate of two-dimensional texture map of each vertex. Herein, a triangular mesh model may be obtained by using a surface reconstruction method using each view image of a multiview image. In addition, a texture map coordinate may be obtained by using a mesh parameterization method of a mesh model.

Hereinafter, an embodiment of a method of transforming a three-dimensional coordinate on a triangular mesh surface to a two-dimensional image coordinate will be described using Equation (2). In Equation (2), the view information θ contains the calibration, rotation and position information of a camera. Specifically, $f_x$ and $f_y$ represent focal distances that are calculated in pixel units of in the directions of x-axis and y-axis respectively. $c_x$ and $c_y$ represent center pixel coordinates of an image sensor. $R_x$, $R_y$ and $R_z$ represent three-dimensional axis rotation information of a camera. $t_x$, $t_y$ and $t_z$ represent three-dimensional position information of a camera.

$$\theta=(f_x,f_y,c_x,c_y,R_X,R_Y,R_Z,t_X,t_Y,t_Z) \quad \text{Equation (2)}$$

Hereinafter, an embodiment of a method of transforming a three-dimensional coordinate on a triangular mesh surface to a two-dimensional image coordinate will be described according to Equation (3) to Equation (6).

The three-dimensional coordinate $(X_i, Y_i, Z_i)$ of a mesh surface may be transformed into a two-dimensional image coordinate $(x_i, y_i)$ through Equation (3).

$$\begin{bmatrix} x'_i \\ y'_i \\ s_i \end{bmatrix} = KR^T\left(\begin{bmatrix} X_i \\ Y_i \\ Z_i \end{bmatrix} - t\right) \quad \text{Equation (3)}$$

$$x_i = x'_i/s_i$$

$$y_i = y'_i/s_i$$

Equation (4) represents the camera intrinsic matrix K of Equation (3).

$$K = \begin{bmatrix} f_x & 0 & c_x \\ 0 & f_y & c_y \\ 0 & 0 & 1 \end{bmatrix} \quad \text{Equation (4)}$$

Equation (5) represents the camera rotation matrix R of Equation (3).

$$R = \begin{bmatrix} \cos R_X\cos R_Z + \sin R_X\sin R_Y\sin R_Z & \cos R_Y\sin R_Z & -\cos R_X\cos R_Z + \cos R_X\sin R_Y\sin R_Z \\ -\cos R_X\sin R_Z + \sin R_X\sin R_Y\cos R_Z & \cos R_Y\cos R_Z & \sin R_X\sin R_Z + \cos R_X\sin R_Y\cos R_Z \\ \sin R_X\cos R_Y & -\sin R_Y & \cos R_X\cos R_Y \end{bmatrix} \quad \text{Equation (5)}$$

Equation (6) represents the camera move vector t of Equation (3).

$$t=[t_X,t_Y,t_Z]^T \quad \text{Equation (6)}$$

Figure 5:
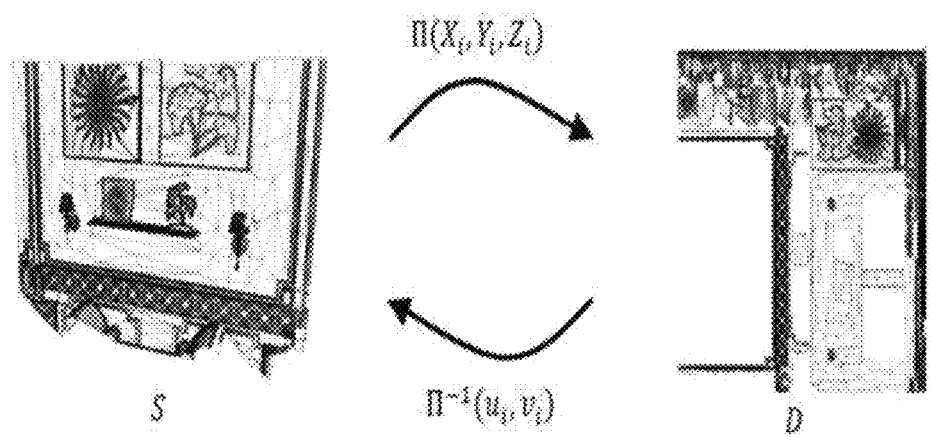
FIG. 5 is a view for describing mesh parameterization of a triangular mesh according to an embodiment of the present disclosure.

FIG. 5 is a view for describing mesh parameterization of a triangular mesh according to an embodiment of the present disclosure.

Hereinafter, a method of transforming a three-dimensional vertex coordinate of a triangular mesh to a two-dimensional texture map coordinate will be described. Each vertex coordinate of a three-dimensional triangular mesh may be mapped onto a two-dimensional texture map plane through the mesh parameterization function Π of Equation (7). In Equation (7), S represents a three-dimensional triangular mesh, and D represents a triangular mesh embedded in a two-dimensional plane.

$$\Pi(X_i,Y_i,Z_i) \mapsto (u_i,v_i), (X_i,Y_i,Z_i) \in S, (u_i,v_i) \in D \quad \text{Equation (7)}$$

In addition, a mesh surface coordinate may be mapped at a texture map coordinate by using the inverse function of the mesh parameterization function Π. In addition, a mesh structure like the one shown in FIG. 4 of the present disclosure may be stored by calculating a three-dimensional coordinate of each vertex and a coordinate of a two-dimensional texture map in advance.

Figure 6:
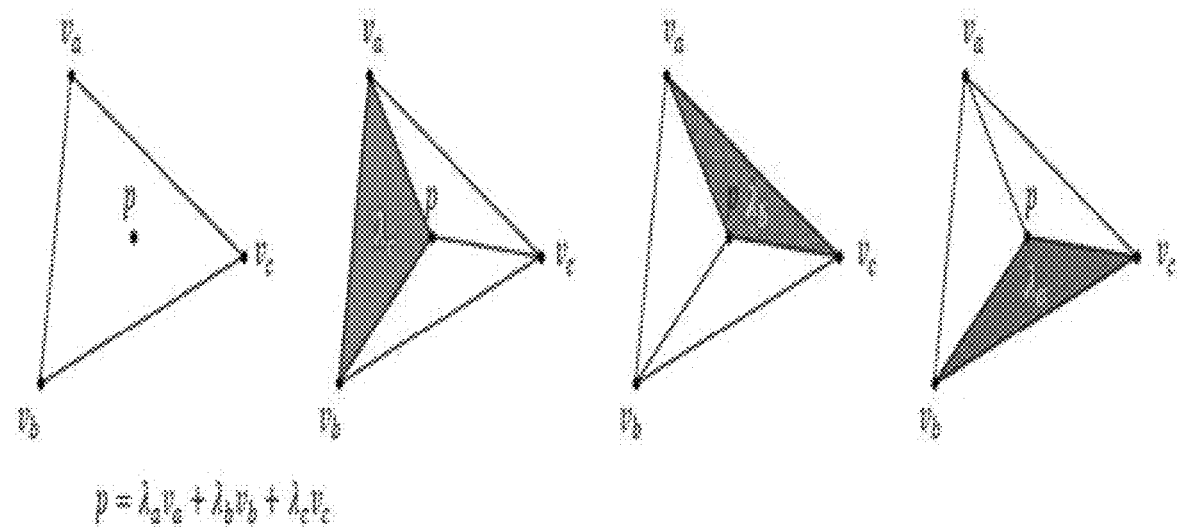
FIG. 6 is a view for describing a barycentric interpolation method according to an embodiment of the present disclosure.

FIG. 6 is a view for describing a barycentric interpolation method according to an embodiment of the present disclosure.

When the vertexes $v_a$, $v_b$ and $v_c$ form a triangle, the coordinate of the point p inside the triangle may be calculated by using a barycentric interpolation method. Equation (8) represents a method of determining $\lambda_a$, $\lambda_b$, and $\lambda_c$ that are weights used for determining a value of the point p.

$$\lambda_a=\text{area}(v_b,v_c,p)/\text{area}(v_a,v_b,v_c)$$

$$\lambda_b=\text{area}(v_c,v_a,p)/\text{area}(v_a,v_b,v_c)$$

$$\lambda_c=\text{area}(v_a,v_b,p)/\text{area}(v_a,v_b,v_c)$$

area($p_0,p_1,p_2$):Area of a triangle connecting three points  Equation (8)

p.X, p.Y and p.Z constituting the point p may be calculated through Equation (9) as follows.

$$p.X=\lambda_a v_a.X+\lambda_b v_b.X+\lambda_c v_c.X$$

$$p.Y=\lambda_a v_a.Y+\lambda_b v_b.Y+\lambda_c v_c.Y$$

$$p.Z=\lambda_a v_a.Z+\lambda_b v_b.Z+\lambda_c v_c.Z \quad \text{Equation (9)}$$

In addition, p.u and p.v constituting the two-dimensional texture map coordinate of the point p may be calculated according to Equation (10).

$$p.u=\lambda_a v_a.u+\lambda_b v_b.u+\lambda_c v_c.u$$

$$p.v=\lambda_a v_a.v+\lambda_b v_b.v+\lambda_c v_c.v \quad \text{Equation(10)}$$

Figure 7:
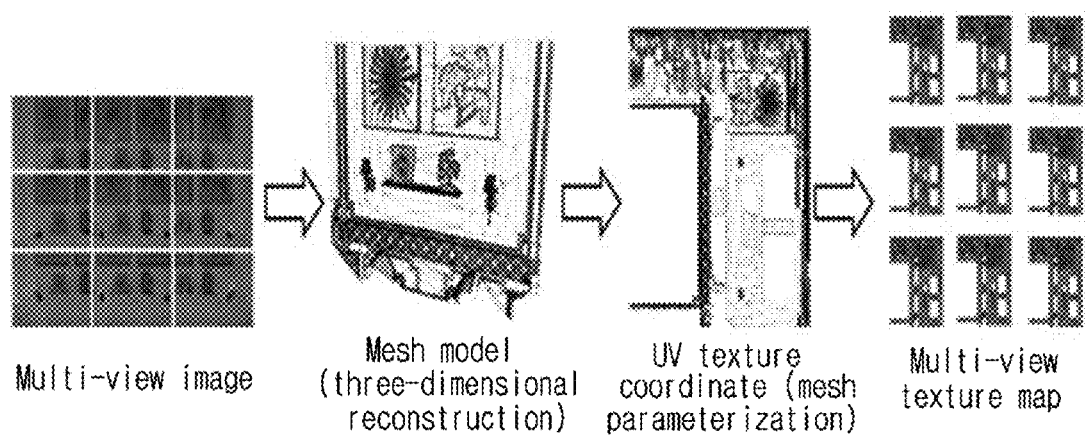
FIG. 7 is a view for describing image transformation for view dependent/independent component separation of a multi-view image according to an embodiment of the present disclosure.

FIG. 7 is a view for describing image transformation for view dependent/independent component separation of a multi-view image according to an embodiment of the present disclosure.

In the present disclosure, the color values of a position that is projected from a one point of a three-dimensional space into different image coordinates of each view image may be analyzed in order to predict a view dependent/independent component in a multi-view image. In addition, a texture map may be used to apply a triangular mesh structure and to store color values collected from each view image. For example, in order to compare colors of K view images for a single point in a three-dimensional space, the single point in the three-dimensional space may be transformed into K texture maps.

That is, as illustrated in FIG. 7, a multi-view image (two-dimensional) is transformed into a triangular mesh model (three-dimensional), and the triangular mesh model (three-dimensional) is transformed into a texture map (two-dimensional).

Hereinafter, according to an embodiment of the present disclosure, an algorithm for multi-view texture map transformation of a multi-view image using a mesh model will be described.

First, a texture map $T_0, T_1, \ldots T_{K-1}$ with K views is initialized. Next, $v_a$, $v_b$ and $v_c$ for every connectivity information $c_i$ of a triangular mesh model may be determined.

In addition, for each pixel (represented as (u, v)) belonging to a triangle on a texture map configured by $v_a$, $v_b$ and $v_c$, the following calculation may be performed. First, a three-dimensional coordinate (X, Y, Z) corresponding to a two-dimensional pixel (u, v) may be calculated according to a coordinate calculation method using a barycentric interpolation method. For example, according to Equation (9), the three-dimensional coordinate (X, Y, Z) corresponding to the two-dimensional pixel (u, v) may be calculated.

In addition, the three-dimensional coordinate (X, Y, Z) may be transformed to K image coordinates (x, y) for K views. For example, according to Equation (3), the three-dimensional coordinate (X, Y, Z) may be transformed into an image coordinate (x, y). In addition, a sampled value $T_k$ (u, v) of a color of $I_k$ (x, y) may be stored in a texture map. $I_k$ (x, y) represents a color value of the coordinate (x, y) of image I ($\theta_k$).

Herein, $I_k$ (x, y) may represent a color of the coordinate (x, y) of image I ($\theta_k$).

According to Equation (11) below, one view independent texture map and K view dependent texture maps may be generated by using K texture maps.

$$T^{ind}(u, v) = \frac{1}{K} \sum_{k=0}^{K-1} T_k(u, v)$$

$$T_k^{dep}(u, v) = T_k(u, v) - T^{ind}(u, v)$$

Equation (11)

Here, the view independent texture map $T^{ind}$ may be an average texture map of a multi-view texture map. In addition, the view dependent texture map $T_k^{dep}$ may be a difference between the k-th view texture map and the view independent texture map $T^{ind}$.

As a plurality of view images are aligned to a same texture map coordinate, other view dependent/independent component decomposition methods than the view dependent/independent component decomposition method may also be easily applied.

Figure 8:
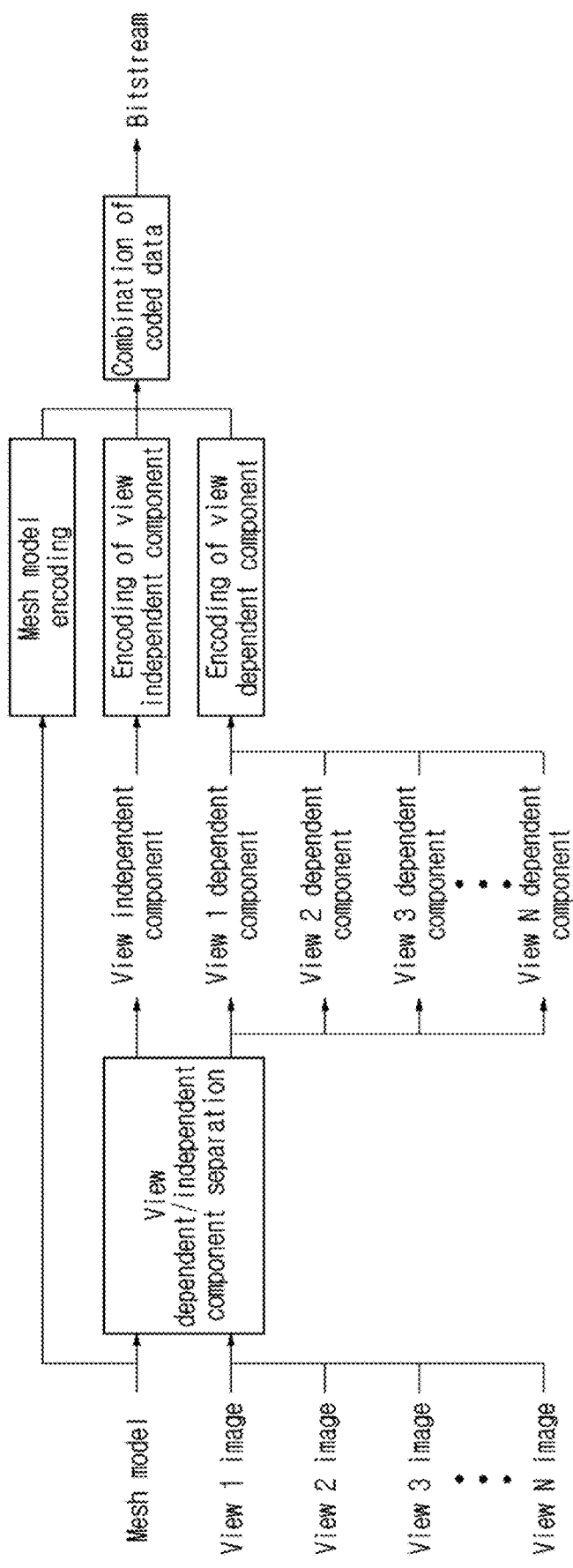
FIG. 8 shows a multi-view image encoding system according to an embodiment of the present disclosure.

FIG. 8 shows a multi-view image encoding system according to an embodiment of the present disclosure.

It may not be efficient to encode all the data of a multi-view image. Accordingly, as shown in FIG. 8, a multi-view image may be encoded by separating a view dependent/independent component. According to the present disclosure, one view independent component texture map and N view dependent component texture maps may be generated by utilizing a multi-view image captured at N views and a three-dimensional triangular mesh structure reconstructed from the multi-view image.

In addition, for a view independent component, only one dataset applicable to each view in a same way may be encoded. In addition, for a view dependent component, all the view dependent component data present at each view may be encoded.

Most information of a multi-view image may be included in a view independent component (Most of the image usually corresponds to a diffuse component). In addition, an image or texture map of a view dependent component has a sparse data density.

Figure 9:
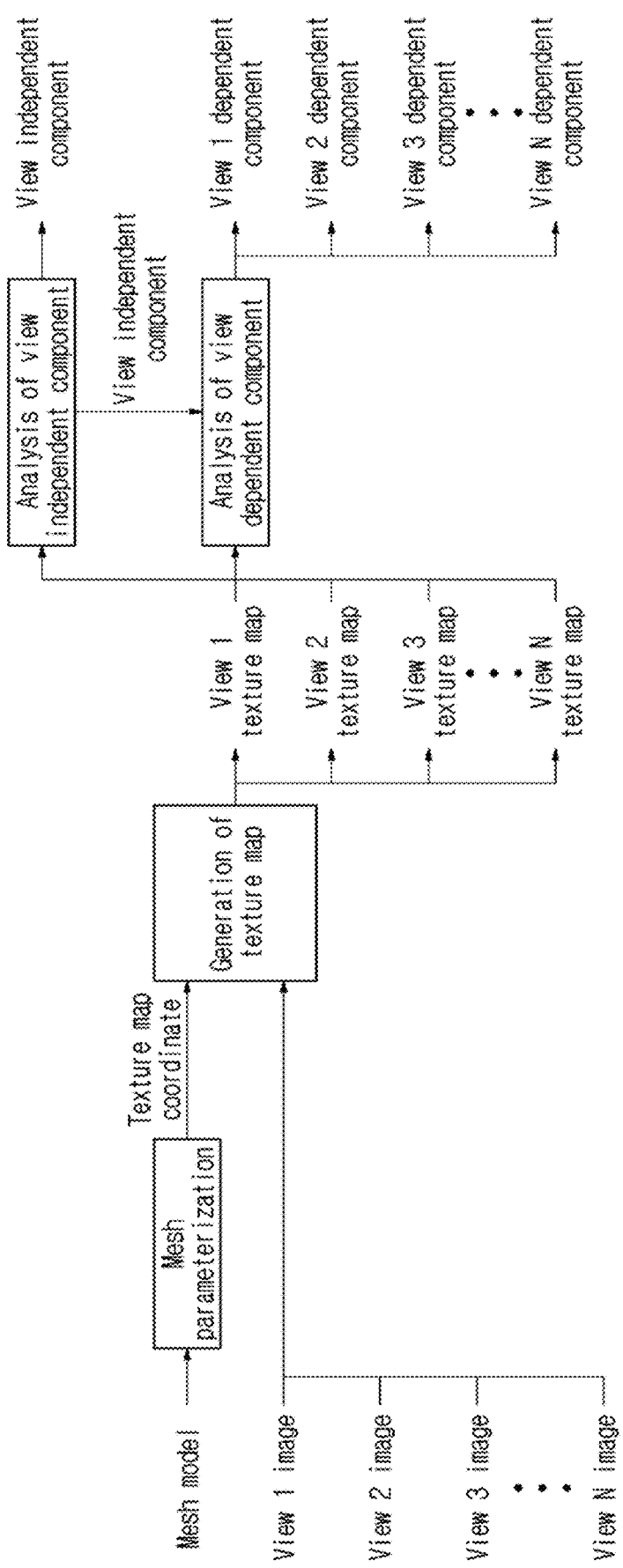
FIG. 9 shows a view dependent/independent component separation module of a multi-view image encoding system according to an embodiment of the present disclosure.

FIG. 9 shows a view dependent/independent component separation module of a multi-view image encoding system according to an embodiment of the present disclosure.

Referring to FIG. 9, the view dependent/independent component separation module may separate a multi-view image and a triangular mesh model into one view independent component (texture map) and as many view dependent components (texture maps) as the number of views.

Figure 10:
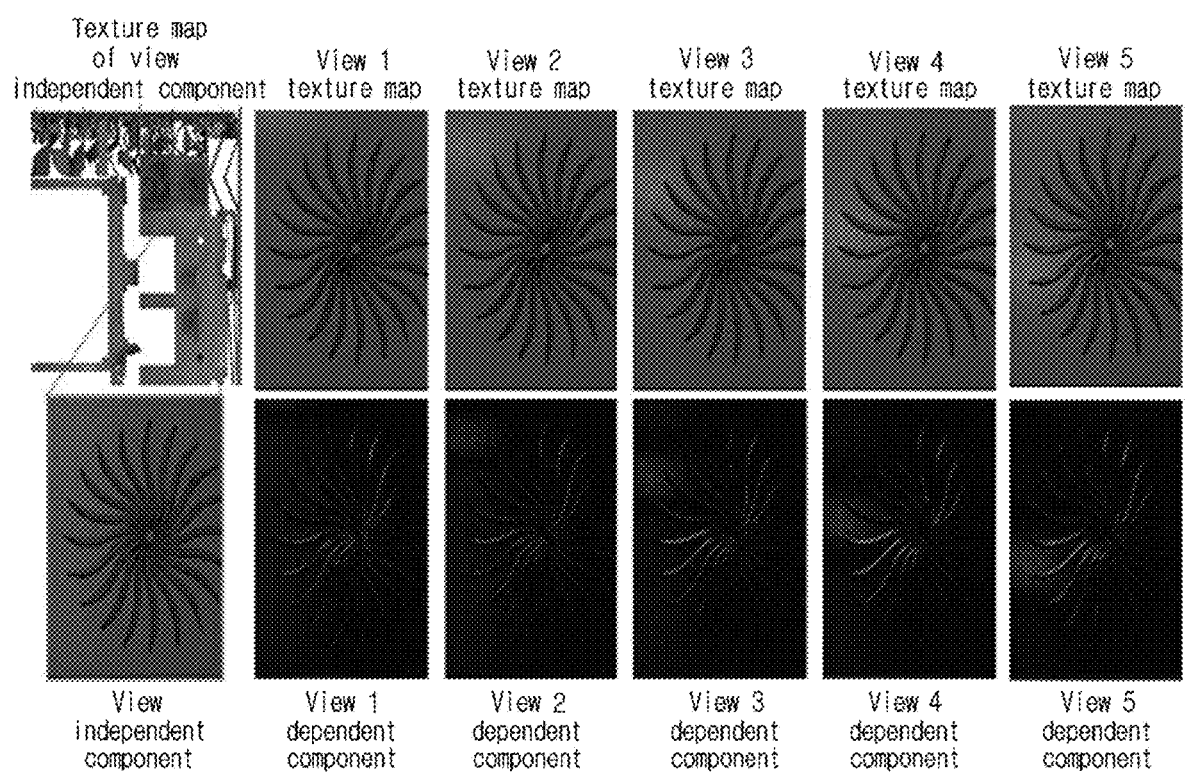
FIG. 10 is a view illustrating an example of view dependent/independent component separation of a multi-view image.

FIG. 10 is a view illustrating an example of view dependent/independent component separation of a multi-view image.

Method of Separating View Dependent/Independent Components of a Multi-View Image A view independent component (average of a multi-view texture map) expresses most image data. In addition, a view dependent component may be a difference between each view texture map and a view independent component. For example, referring to FIG. 10, the dependent components of view 1 to view 5 consist of residual values between the view independent component and the texture maps of view 1 to view 5 respectively.

Herein, as each view image may be compared at a same coordinate, another modeling method for view dependent/independent components may be easily implemented.

The view dependent/independent component decomposition method may be applied to viewer's view-adaptive image rendering.

An image rendering system may receive an input of information $\theta_u$ on a viewer's view through a head mounted display or a view information sensor. A view-adaptive image may be defined as in Equation (12) below.

$$I(\theta_u) = I^{ind} + I^{dep}(\theta_u)$$

$$I^{ind} = P(M, T^{ind}, \theta_u)$$

$$I^{dep}(\theta_u) = P(M, T_u^{dep}, \theta_u)$$

$$T_u^{dep} = \sum_{k=0}^{K-1} w_k T_k^{dep}$$

Equation (12)

P (M,T,θ) is a rasterization function. According to the function, a triangular mesh M may be mapped onto an image plane by considering the camera information, position and posture of view information θ, and the color of each pixel may be mapped from an input texture map T.

A user view dependent component $I_{dep}(\theta_u)$ is generated by rasterizing $T_u^{dep}$, a weighted sum of view dependent texture maps.

The weight $W_k$ is calculated using a distance between the k-th view information $\theta_k$ and the user view information $\theta_u$ of a multi-view image. For example, according to Equation (13), the weight $W_k$ may be calculated. In Equation (13), α represents a weight for a distance of three-dimensional rotation between two views, and β represents a weight for a distance of three-dimensional position between two views. In addition, $D_{rot}$ ($R_a$, $R_b$) represents a distance function of three-dimensional rotation matrix between two views, and $D_{pos}$ ($t_a$, $t_b$) represents a distance function of three-dimensional position vector between two views.

$$w_k = \alpha D_{rot}(R_u, R_k) + \beta D_{pos}(t_u, t_k)$$

Equation (13)

Herein, $D_{rot}$ may be calculated by selecting one of many methods for calculating a distance of rotation matrix.

In addition, $D_{pos}(t_a, t_b)$ may be calculated according to Equation (14) below. Equation (14)

$$D_{pos}(t_a, t_b) = \sqrt{(X_a - X_b)^2 + (Y_a - Y_b)^2 + (Z_a - Z_b)^2}$$

Figure 11:
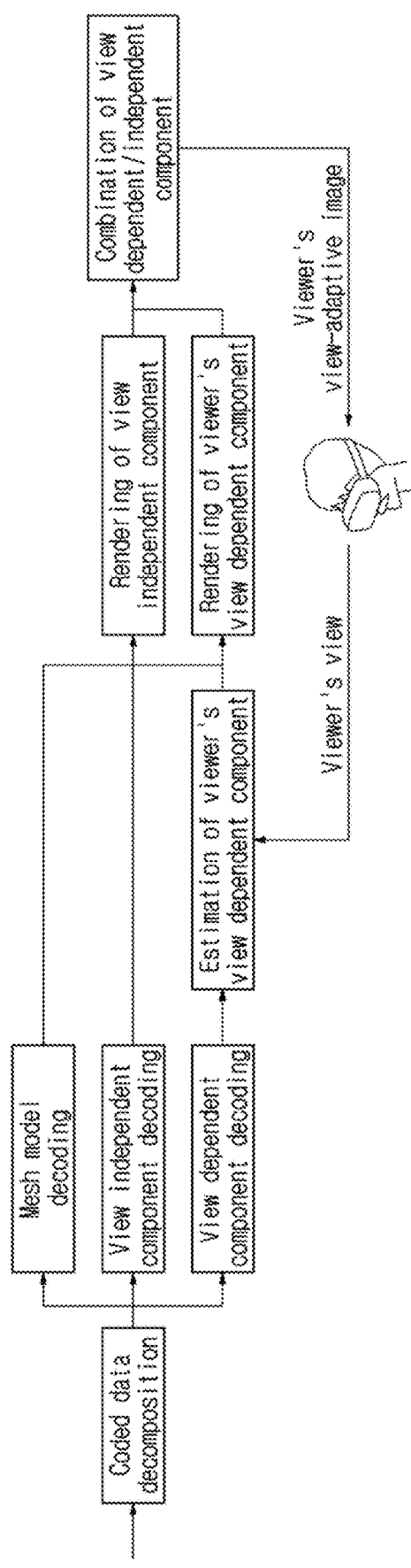
FIG. 11 is a view for describing a viewer's view adaptive rendering method according to an embodiment of the present disclosure.

FIG. 11 is a view for describing a viewer's view adaptive rendering method according to an embodiment of the present disclosure.

According to the viewer's view adaptive rendering method, a viewer's view dependent component may be estimated. In addition, view dependent components stored in encoding data may be combined (blended) with consideration of a viewer's view. A viewer's view adaptive image may be determined according to a sum of a view independent component and a viewer's view dependent component.

As a viewer's view changes, a viewer's view adaptive image may be determined by recalculating only a viewer's view dependent component. In addition, even when a viewer's view changes, a view independent component may be maintained.

In order to show a multi-view image realistically according to a change in a view change of a viewer, a view dependent component needs to be well expressed according to the view change. For example, when a viewer moves while seeing a stainless-steel kettle, the reflection pattern of the kettle should change according to positions. Through the present disclosure, a dependent component of a new view not present in an original multi-view image may be estimated.

A general triangular mesh-based multi-view image may be reconstructed three-dimensionally in the following procedure.

1. Transform pixels of each view image into a point cloud by using depth information.
2. Register point clouds of each view by using view information.
3. Generate a triangular mesh from registered point clouds through triangulation.
4. Calculate two-dimensional UV coordinates of mesh vertexes through mesh parameterization.
5. Project every triangle of a triangular mesh into a multi-view image, sample colors inside the triangle and store the colors in a two-dimensional UV plane.

Color values that are stored on a two-dimensional UV plane to express texture of a triangular mesh are referred to as a UV map or a texture map.

As the resolution of a multi-view image and the range of an expressed space increase, the number of point clouds increases and thus the triangulation for generating a mesh becomes complex and takes a longer time.

As an alternative to this, there is a marching cube algorithm that divides a space expressed by a multi-view image into equal voxels by using depth information of each view and then generates a mesh for each voxel. A marching cube algorithm is a method of expressing a polygonal iso-surface into a triangular mesh shape from volume data expressed by a three-dimensional scalar field.

Volume data used in a marching cube algorithm consist of a set of unit cubes referred to as voxels with a three-dimensional regular grid shape. A marching cube algorithm extracts a surface with a same level having a specific value referred to as iso-value from volume data. The surface is referred to as iso-surface.

FIG. 12 is a view showing a two-dimensional marching square algorithm with 4×4 volume data according to an embodiment of the present disclosure. Herein, three dimensions may be referred to as a marching cube, and two dimensions may be referred to as a marching square.

Figure 13:
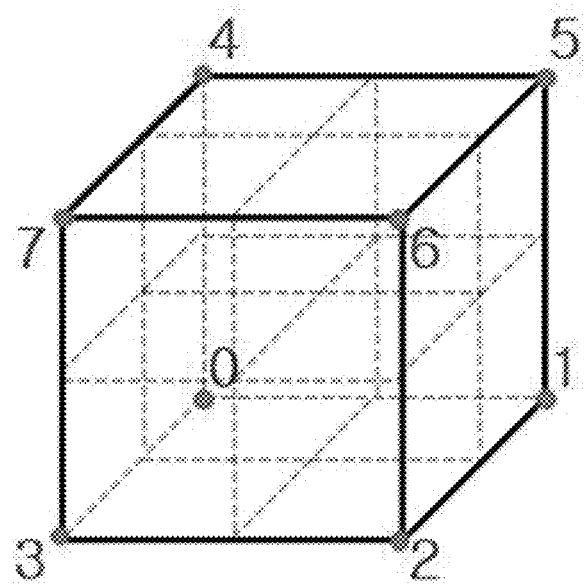
FIG. 13 is a view for describing indexing of 8 voxel vertexes of a marching cube algorithm according to an embodiment of the present disclosure.

FIG. 13 is a view for describing indexing of 8 voxel vertexes of a marching cube algorithm according to an embodiment of the present disclosure. A marching cube algorithm determines whether 8 vertex values of voxel in a three-dimensional grid are greater or smaller than an iso-value. Thus, a surface of a corresponding region may be set as one of pre-defined 256 ($=2^8$) triangulation types.

When a triangulation type is determined, the shape of the type may be found in a pre-defined lookup table. Hereinafter, an example of triangular structure lookup table corresponding to each triangulation type will be described.

In a marching cube algorithm, by referring to a pre-defined lookup table to determine which vertexes among 12 pre-defined vertexes in voxel are to be intersected for forming a triangular structure, structures of 256 triangulation types may be determined.

For example, the lookup table value of a second triangulation type is {0, 8, 3, −1, −1, −1, −1, −1, −1, −1, −1, −1, −1, −1, −1, −1}, meaning that a triangle is generated by connecting vertexes 0, 8 and 3.

tri_table[1]={0,8,3,−1,−1,−1,−1,−1,−1,−1,−1,−1,−1, −1,−1,−1}

Figure 14:
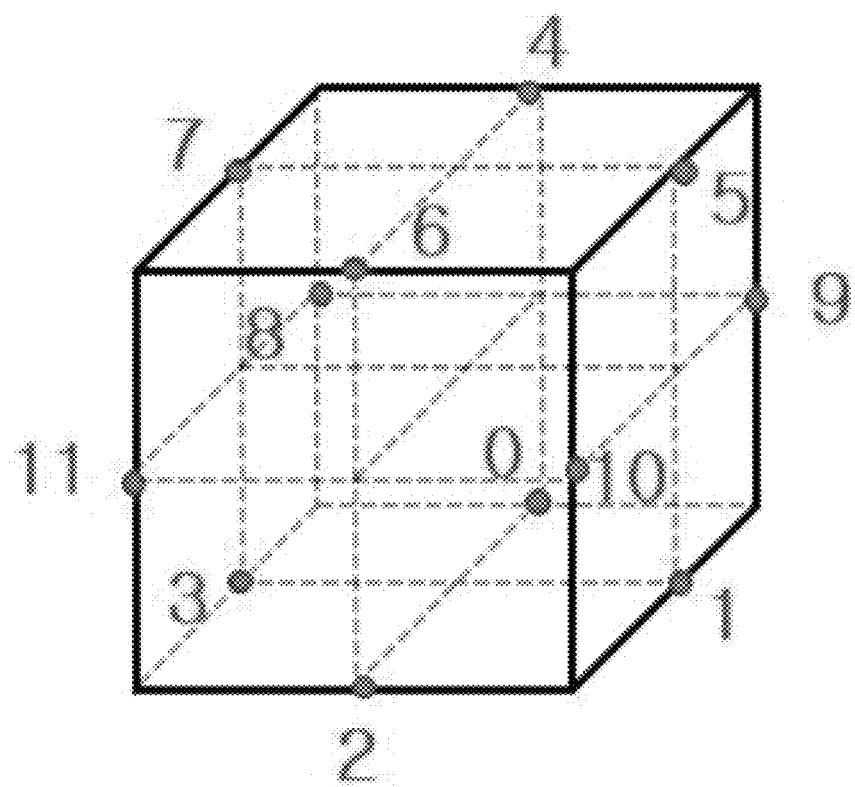
FIG. 14 is a view for describing indexing of 12 vertexes of a marching cube algorithm according to an embodiment of the present disclosure.

FIG. 14 is a view for describing indexing of 12 vertexes of a marching cube algorithm according to an embodiment of the present disclosure.

Figure 15:
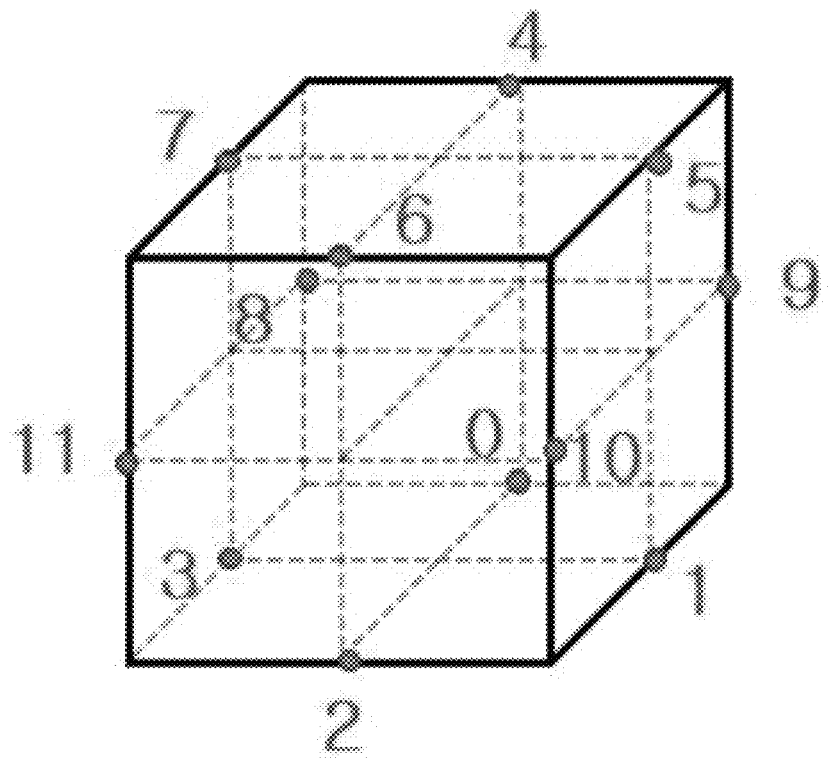
FIG. 15 is a view for describing an example of connection structure of a second triangulation type described as the example, according to an embodiment of the present disclosure.

FIG. 15 is a view for describing an example of connection structure of a second triangulation type described as the example, according to an embodiment of the present disclosure.

Figure 16:
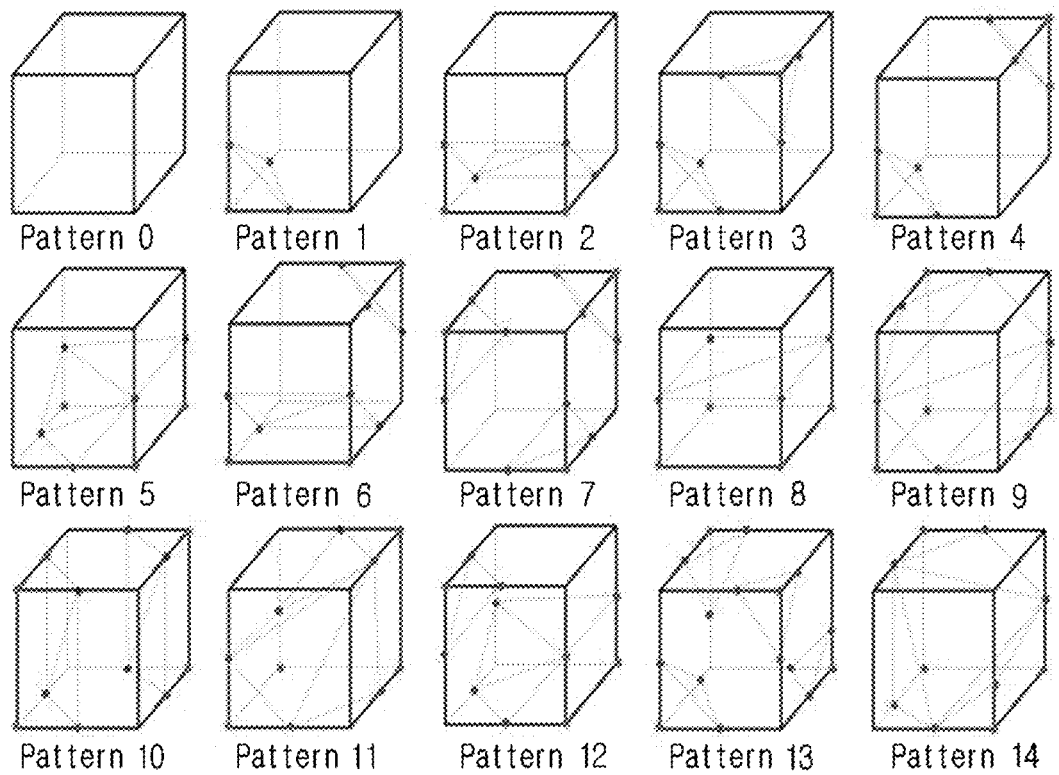
FIG. 16 is a view for describing 15 triangulation patterns of marching cube according to an embodiment of the present disclosure.

FIG. 16 is a view for describing 15 triangulation patterns of marching cube according to an embodiment of the present disclosure.

Referring to FIG. 16, a total of 256 triangulation types may be classified into 15 patterns by considering symmetry and rotation. Hereinafter, an example of pattern index transformation lookup table of triangulation type index will be presented.

According to the lookup table, a pattern index may be obtained from a triangulation type index.

pattern_index=pattern_table[case_index]

General three-dimensional mesh information includes connectivity information of a three-dimensional coordinate of every vertex and a triangle. Mesh information generated by a marching cube algorithm includes a triangulation type index expressed by 1 byte in a search order of volume grid. When a triangle is constructed by using a lookup table value corresponding to a triangulation type case in the search order of volume grid, a three-dimensional mesh may be reconstructed.

When using a plurality of depth images, volume data for a large space may be configured. A three-dimensional mesh of a captured space may be generated by using the configured volume data and a marching cube algorithm. Texture may be expressed by mapping texture information, which is extracted from a color image, to a three-dimensional mesh surface.

Figure 17:
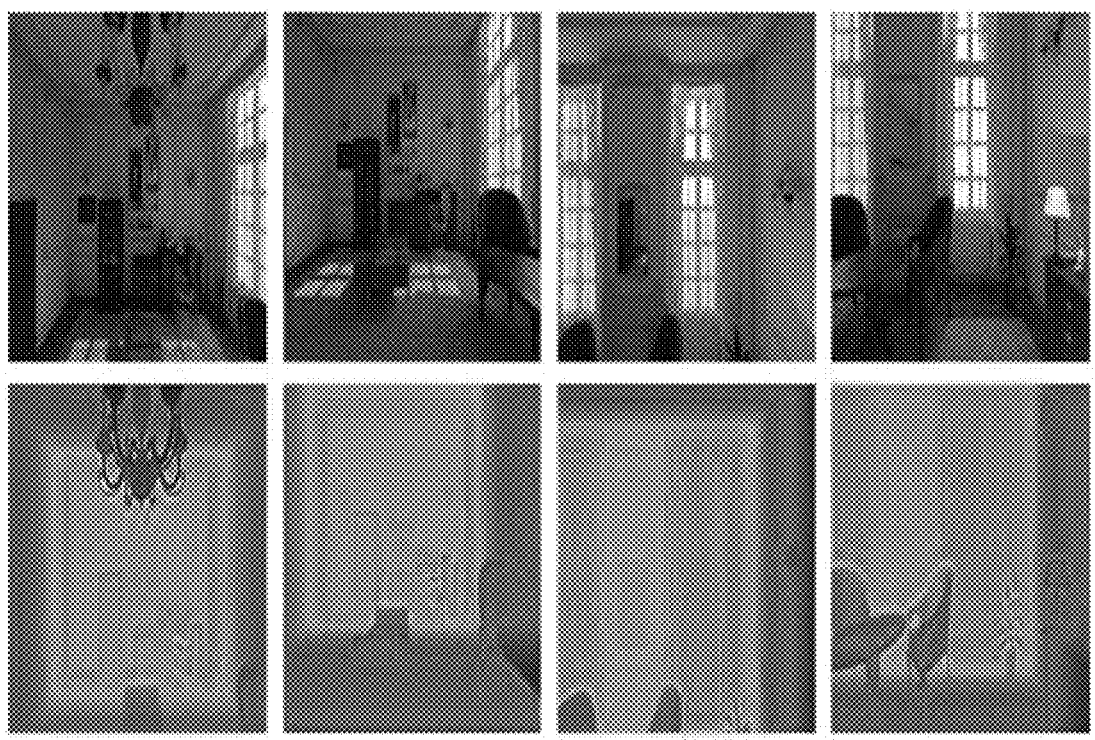
FIG. 17 illustrates a sequence of color images and a sequence of depth images for a space according to an embodiment of the present disclosure.

FIG. 17 illustrates a sequence of color images and a sequence of depth images for a space according to an embodiment of the present disclosure.

Figure 18:
FIG. 18 illustrates a configuration of volume data using the depth image sequence of FIG. 17, according to an embodiment of the present disclosure.

FIG. 18 illustrates a configuration of volume data using the depth image sequence of FIG. 17, according to an embodiment of the present disclosure.

Figure 19:
FIG. 19 illustrates a three-dimensional mesh generated using the volume data and the marching cube algorithm of FIG. 18, according to an embodiment of the present disclosure.

FIG. 19 illustrates a three-dimensional mesh generated using the volume data and the marching cube algorithm of FIG. 18, according to an embodiment of the present disclosure.

Figure 20:
FIG. 20 illustrates a texture representation by mapping the color image of FIG. 17 to the three-dimensional mesh of FIG. 19, according to an embodiment of the present disclosure.

FIG. 20 illustrates a texture representation by mapping the color image of FIG. 17 to the three-dimensional mesh of FIG. 19, according to an embodiment of the present disclosure.

In order to express texture in a three-dimensional mesh, colors of all the triangles of a mesh sampled from color images are stored on a two-dimensional UV map (or texture map). Mesh parameterization means an operation of defining a one-to-one function between a vertex coordinate of a three-dimensional mesh and a two-dimensional LTV map coordinate before making a LTV map. Mesh parameterization is an operation that requires a lot of computation time and computer resources. Accordingly, as the size of a mesh model increases, the calculation for mesh parameterization becomes more complicated.

Figure 21:
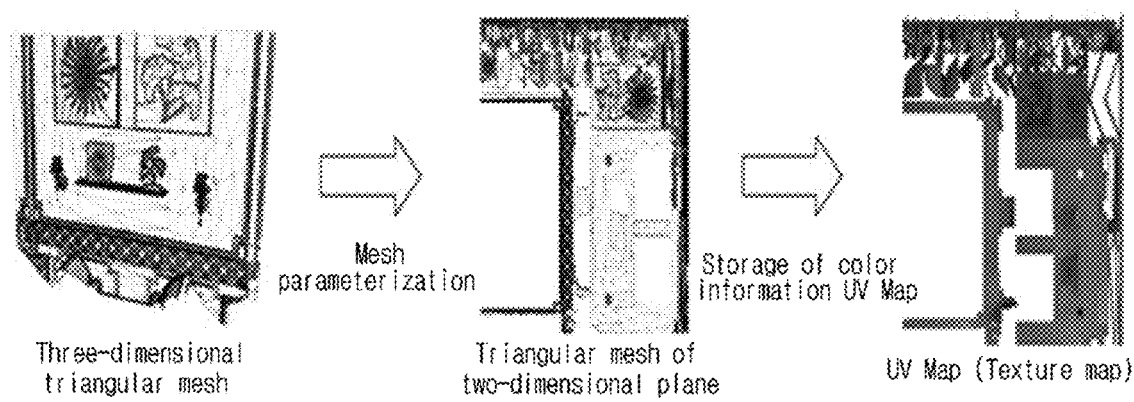
FIG. 21 illustrates an example of mesh parameterization and UV Map generation according to an embodiment of the present disclosure.

FIG. 21 illustrates an example of mesh parameterization and UV Map generation according to an embodiment of the present disclosure.

In the present disclosure, a method of performing mesh parameterization rapidly by using pre-defined UV coordinates for each of 14 patterns of marching cube mesh is described. UV patterns corresponding to 14 marching cube patterns are calculated beforehand in a [0, 1]×[0, 1] range of two-dimensional plane. As Pattern 0 among 15 patterns has no vertex information, it has no UV pattern that is to be defined in advance. For the marching cube patterns 1 to 14, a LTV coordinate corresponding to each vertex may be determined in advance.

Hereinafter, FIGS. 22 to 35 illustrate UV coordinates of vertexes for the marching cube patterns 1 to 14.

Figure 22:
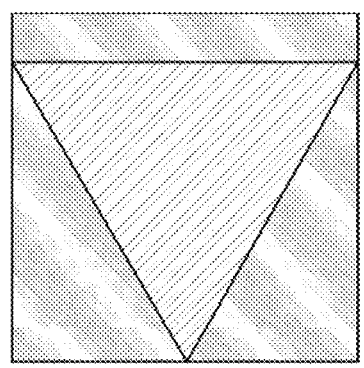
FIGS. 22 to 35 illustrate UV coordinates of vertexes for the marching cube patterns 1 to 14.

FIG. 22 illustrates Pattern 1 according to an embodiment of the present disclosure.

<Pattern 1>
Number of triangles: 1
First triangle vertex index: 2, 3, 11 (refer to FIG. 14)
UV coordinate of Vertex 2: 0.000093, 0.865957
UV coordinate of Vertex 3: 0.500000, 0.000093
UV coordinate of Vertex 11: 0.999907, 0.865957

Figure 23:
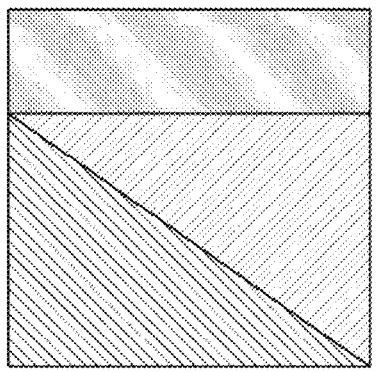

FIG. 23 illustrates Pattern 2 according to an embodiment of the present disclosure.

<Pattern 2>
Number of triangles: 2
First triangle vertex index: 1, 3, 10
Second triangle vertex index: 3, 10, 11
UV coordinate of Vertex 1: 0.999916 0.707072
UV coordinate of Vertex 3: 0.000084 0.707072
UV coordinate of Vertex 10: 0.999916 0.000084
UV coordinate of Vertex 11: 0.000084 0.000084

Figure 24:
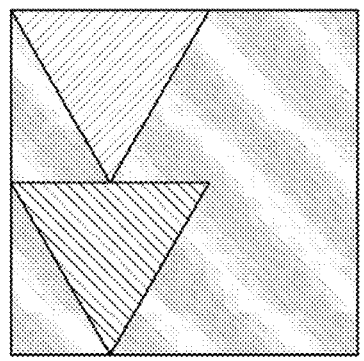

FIG. 24 illustrates Pattern 3 according to an embodiment of the present disclosure.

<Pattern 3>
Number of triangles: 2
First triangle vertex index: 2, 3, 11
Second triangle vertex index: 5, 6, 10
UV coordinate of Vertex 2: 0.000107 0.999893
UV coordinate of Vertex 3: 0.288658 0.500107
UV coordinate of Vertex 11: 0.577210 0.999893
UV coordinate of Vertex 5: 0.288659 0.000107
UV coordinate of Vertex 6: 0.577210 0.499893
UV coordinate of Vertex 10: 0.000107 0.499893

Figure 25:
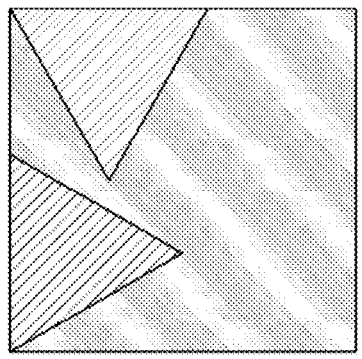

FIG. 25 illustrates Pattern 4 according to an embodiment of the present disclosure.

<Pattern 4>
Number of triangles: 2
First triangle vertex index: 2, 3, 11
Second triangle vertex index: 4, 5, 9
UV coordinate of Vertex 2: 0.000100 0.999900
UV coordinate of Vertex 3: 0.267942 0.535984
UV coordinate of Vertex 11: 0.535784 0.999900
UV coordinate of Vertex 4: 0.464016 0.267942
UV coordinate of Vertex 5: 0.000100 0.535784
UV coordinate of Vertex 9: 0.000100 0.000100

Figure 26:
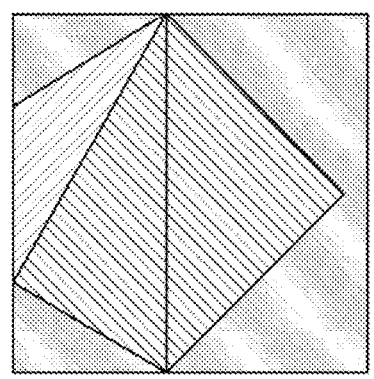

FIG. 26 illustrates Pattern 5 according to an embodiment of the present disclosure.

<Pattern 5>
Number of triangles: 3
First triangle vertex index: 2, 3, 10
Second triangle vertex index: 3, 8, 10
Third triangle vertex index: 8, 9, 10
UV coordinate of Vertex 2: 0.000097 0.749952
UV coordinate of Vertex 3: 0.000097 0.250048
UV coordinate of Vertex 10: 0.433026 0.999903
UV coordinate of Vertex 8: 0.433026 0.000097
UV coordinate of Vertex 9: 0.932929 0.500000

Figure 27:
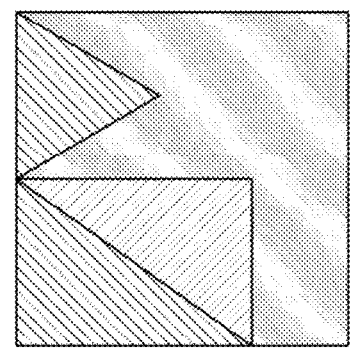

FIG. 27 illustrates Pattern 6 according to an embodiment of the present disclosure.

<Pattern 6>
Number of triangles: 3
First triangle vertex index: 1, 3, 10
Second triangle vertex index: 3, 10, 11
Third triangle vertex index: 4, 5, 9
UV coordinate of Vertex 1: 0.706913 0.499894
UV coordinate of Vertex 3: 0.000106 0.499894
UV coordinate of Vertex 10: 0.706913 0.000106
UV coordinate of Vertex 11: 0.000106 0.000106
UV coordinate of Vertex 4: 0.432935 0.750000
UV coordinate of Vertex 5: 0.000106 0.999894
UV coordinate of Vertex 9: 0.000106 0.500106

Figure 28:
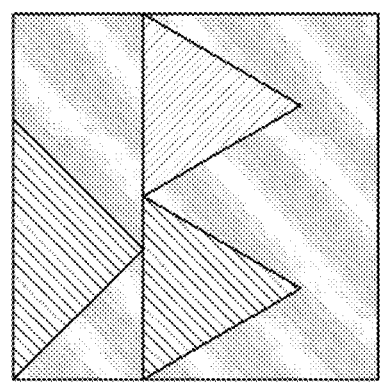

FIG. 28 illustrates Pattern 7 according to an embodiment of the present disclosure.

<Pattern 7>
Number of triangles: 3
First triangle vertex index: 1, 2, 10
Second triangle vertex index: 4, 5, 9
Third triangle vertex index: 7, 8, 11
UV coordinate of Vertex 1: 0353780 0.999857
UV coordinate of Vertex 2: 0.353780 0.500143
UV coordinate of Vertex 10: 0.786545 0.750000
UV coordinate of Vertex 4: 0.786545 0.250000
UV coordinate of Vertex 5: 0.353780 0.499857
UV coordinate of Vertex 9: 0.353780 0.000143
UV coordinate of Vertex 7: 0.353494 0.353494
UV coordinate of Vertex 8: 0.000143 0.706845
UV coordinate of Vertex 11: 0.000143 0.000143

Figure 29:
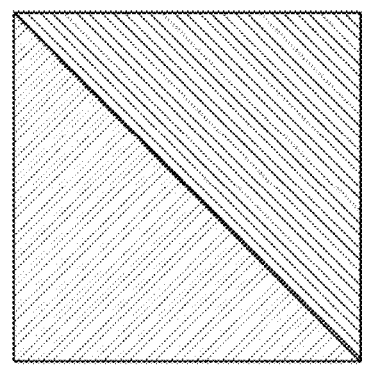

FIG. 29 illustrates Pattern 8 according to an embodiment of the present disclosure.

<Pattern 8>
Number of triangles: 2
First triangle vertex index: 8, 9, 11
Second triangle vertex index: 9, 10, 11
UV coordinate of Vertex 8: 0.000100 0.000100
UV coordinate of Vertex 9: 0.999900 0.000100
UV coordinate of Vertex 11: 0.000100 0.999900
UV coordinate of Vertex 10: 0.999900 0.999900

Figure 30:
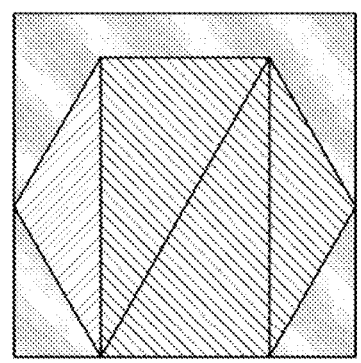

FIG. 30 illustrates Pattern 9 according to an embodiment of the present disclosure.

<Pattern 9>
Number of triangles: 4
First triangle vertex index: 1, 2, 9
Second triangle vertex index: 2, 9, 11
Third triangle vertex index: 4, 9, 11
Fourth triangle vertex index: 4, 7, 11
UV coordinate of Vertex 1: 0.000093 0.433025
UV coordinate of Vertex 2: 0.250047 0.865957
UV coordinate of Vertex 9: 0.250047 0.000093
UV coordinate of Vertex 11: 0.749954 0.865957
UV coordinate of Vertex 4: 0.749954 0.000093
UV coordinate of Vertex 7: 0.999907 0.433025

Figure 31:
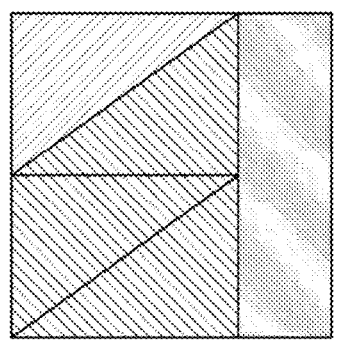

FIG. 31 illustrates Pattern 10 according to an embodiment of the present disclosure.

<Pattern 10>
Number of triangles: 4
First triangle vertex index: 0, 1, 5
Second triangle vertex index: 0, 4, 5
Third triangle vertex index: 2, 3, 6
Fourth triangle vertex index: 3, 6, 7
UV coordinate of Vertex 0: 0.000119 0.500119
UV coordinate of Vertex 1: 0.000119 0.999881
UV coordinate of Vertex 5: 0.706889 0.999881
UV coordinate of Vertex 4: 0.706889 0.500119
UV coordinate of Vertex 2: 0.000119 0.499881
UV coordinate of Vertex 3: 0.000119 0.000119
UV coordinate of Vertex 6: 0.706889 0.499881
UV coordinate of Vertex 7: 0.706889 0.000119

Figure 32:
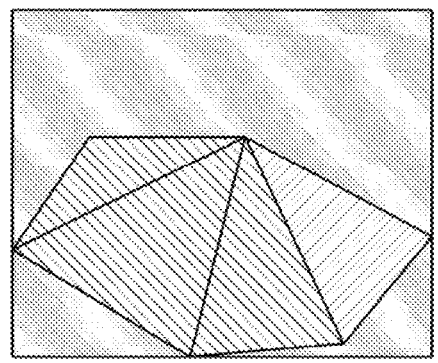

FIG. 32 illustrates Pattern 11 according to an embodiment of the present disclosure.

<Pattern 11>
Number of triangles: 4
First triangle vertex index: 1, 2, 5
Second triangle vertex index: 2, 5, 11
Third triangle vertex index: 4, 5, 8
Fourth triangle vertex index: 5, 8, 11
UV coordinate of Vertex 1: 0.999921 0.344519
UV coordinate of Vertex 2: 0.797261 0.032315
UV coordinate of Vertex 5: 0.558398 0.631122
UV coordinate of Vertex 11: 0.426447 0.000079
UV coordinate of Vertex 4: 0.186186 0.631122
UV coordinate of Vertex 8: 0.000079 0.308777

Figure 33:
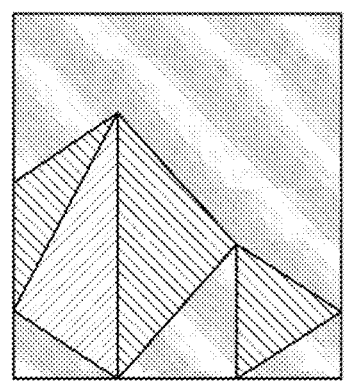

FIG. 33 illustrates Pattern 12 according to an embodiment of the present disclosure.

<Pattern 12>
Number of triangles: 4
First triangle vertex index: 2, 3, 8
Second triangle vertex index: 3, 8, 10
Third triangle vertex index: 6, 7, 11
Fourth triangle vertex index: 8, 9, 10
UV coordinate of Vertex 2: 0.000105 0.548913
UV coordinate of Vertex 3: 0.000105 0.183041
UV coordinate of Vertex 8: 0.316959 0.731849
UV coordinate of Vertex 10: 0.316959 0.000105
UV coordinate of Vertex 6: 0.999895 0.183041
UV coordinate of Vertex 7: 0.683041 0.365977
UV coordinate of Vertex 11: 0.683041 0.000105
UV coordinate of Vertex 9: 0.682831 0.365977

Figure 34:
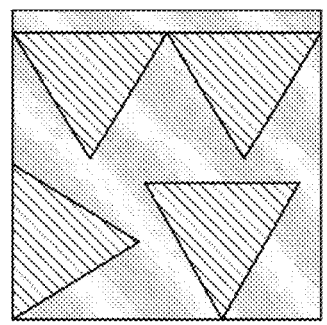

FIG. 34 illustrates Pattern 13 according to an embodiment of the present disclosure.

<Pattern 13>
Number of triangles: 4
First triangle vertex index: 0, 1, 9
Second triangle vertex index: 2, 3, 11
Third triangle vertex index: 4, 7, 8
Fourth triangle vertex index: 5, 6, 10
UV coordinate of Vertex 0: 0.000186 0.932876
UV coordinate of Vertex 1: 0.250000 0.500186
UV coordinate of Vertex 9: 0.499814 0.932876
UV coordinate of Vertex 2: 0.500186 0.932876
UV coordinate of Vertex 3: 0.750000 0.500186
UV coordinate of Vertex 11: 0.999814 0.932876
UV coordinate of Vertex 4: 0.432877 0.250000
UV coordinate of Vertex 7: 0.000186 0.499814
UV coordinate of Vertex 8: 0.000186 0.000186
UV coordinate of Vertex 5: 0.683063 0.000186
UV coordinate of Vertex 6: 0.932877 0.432876
UV coordinate of Vertex 10: 0.433249 0.432876

Figure 35:
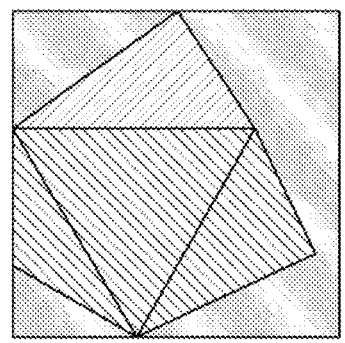

FIG. 35 illustrates Pattern 14 according to an embodiment of the present disclosure.

<Pattern 14>
Number of triangles: 4
First triangle vertex index: 2, 3, 7
Second triangle vertex index: 2, 7, 9
Third triangle vertex index: 2, 9, 10
Fourth triangle vertex index: 4, 7, 9
UV coordinate of Vertex 2: 0.747655 0.647501
UV coordinate of Vertex 3: 0.498469 0.999904
UV coordinate of Vertex 7: 0.000096 0.647501
UV coordinate of Vertex 9: 0373876 0.000096
UV coordinate of Vertex 10: 0.928252 0.255498
UV coordinate of Vertex 4: 0.000096 0.215898

A more optimized pattern than the UV patterns specified in the present disclosure may be applied.

In the present disclosure, a UV map not of a whole space but of corresponding subspace in each voxel is generated. Such UV map is defined as UV patch. The width and length of a UV patch may have any inter value other than 0. As a two-dimensional vertex coordinate of a UV pattern is normalized from 0 to 1, a pixel coordinate of a UV patch corresponding to a UV coordinate may be calculated through 'U-coordinate value*width of UV patch' or 'V-coordinate value*length of UV patch'.

In the present disclosure, in order to encode texture information, a texture space for each pattern (1~14) may be defined beforehand. Texture may be expressed by storing a coordinate value of a defined texture space in each voxel corresponding to each pattern.

Hereinafter, an algorithm for defining a texture space and calculating a texture space coordinate will be described.

1. Calculate triangulation type c and pattern p of every voxel of a volume grid and generate a LTV patch vector t by using a color image.
   c: Integer index of triangulation type between 0 and 255
   p: Integer index of triangulation pattern between and 14
   t: M?1 vector transformed from a two-dimensional UV patch
2. Calculate an average UV patch vector $$t_\mu = \frac{1}{N}\sum_{i=0}^{N} t_i$$

of the pattern p.
   N: Number of voxels belonging to triangulation pattern p
3. Calculate the difference $d_i = t_i - t_\mu$ between IN patch vector $t_i$ and UV patch vector $t_\mu$ belonging to the pattern p.
4. Calculate a covariance matrix C of UV patches belonging to the pattern p.

$$C = \frac{1}{N}\sum_{i=0}^{N} d_i d_i^T = AA^T, \text{ where } A = [d_1, d_2, \ldots, d_N]$$

Hereinafter, an algorithm for reconstructing texture (UV patch) by using a texture spatial coordinate will be described.

1. Load L eigenvector matrices $E=[e_1, e_2, \ldots, e_L]$ of the pattern p, the average UV patch vector $t_\mu$, and the texture spatial coordinate co of a voxel of which texture is to be reconstructed.
2. Approximate the texture of voxel to be reconstructed by using the formula $t_i \approx E\omega_i + t_\mu$.

When the number L (1≤L≤M) of eigenvectors increases, texture thus reconstructed becomes closer to the original but data to be stored increases. On the other hand, when the number L (1≤L≤M) of eigenvectors decreases, data to be stored decreases but the error with the original texture increases.

The number L of eigenvectors is set by considering a reconstruction rate of original and a size of encoded data.

FIG. 36 shows a data list for storing geometry information and texture information according to an embodiment of the present disclosure. FIG. 36 present data to be finally stored to reconstruct geometry information and texture information in the present disclosure.

Figure 37:
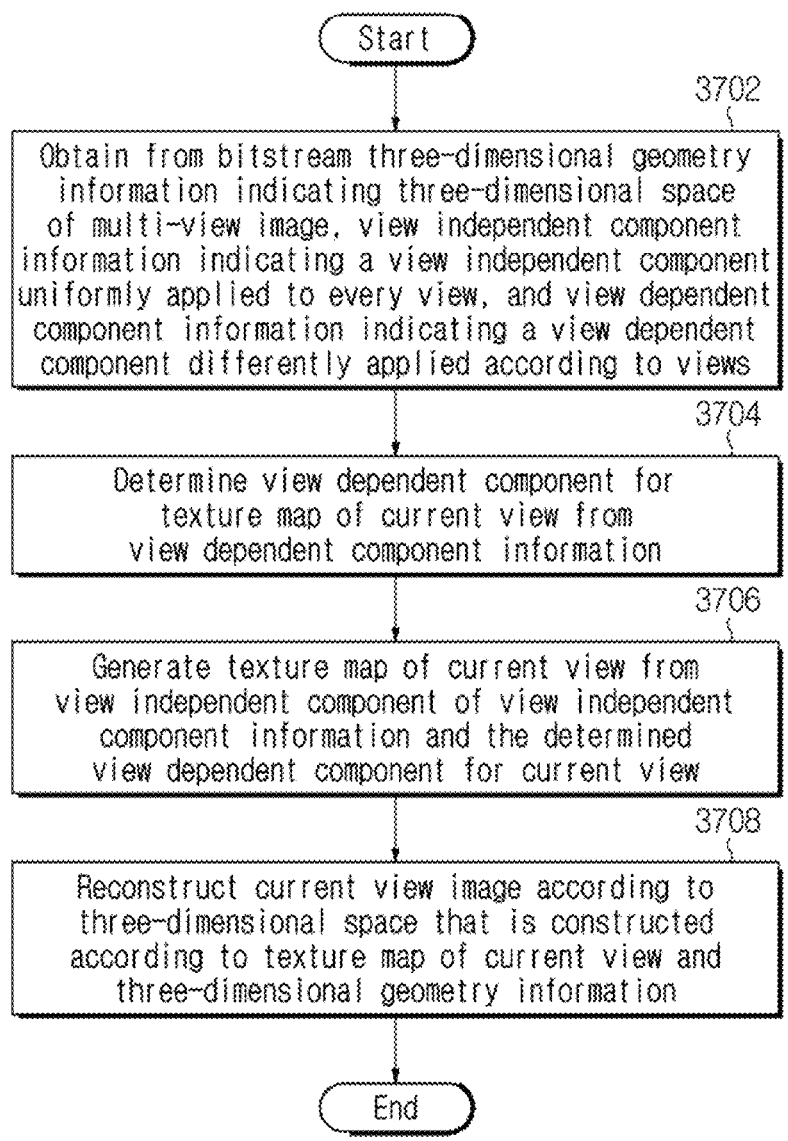
FIG. 37 illustrates a multi-view image decoding method according to an embodiment of the present disclosure.

FIG. 37 illustrates a multi-view image decoding method according to an embodiment of the present disclosure.

In the step S3702, three-dimensional geometry information indicating a three-dimensional space of a multi-view image, view independent component information indicating a view independent component, which is uniformly applied to every view, and view dependent component information indicating a view dependent component, which is differently applied according to views may be obtained from a bitstream.

According to an embodiment, the three-dimensional geometry information may indicate a triangular mesh structure representing a three-dimensional space. The three-dimensional geometry information may include at least one of vertex position information indicating three-dimensional positions of vertexes of a triangular mesh, connectivity information indicating geometric connection between the vertexes of the triangular mesh, and texture map position information indicating a two-dimensional position corresponding to a vertex of the triangular mesh.

According to an embodiment, the triangular mesh structure may be determined in voxel units of the three-dimensional space, and a triangular mesh structure for a voxel may be determined as one of a plurality of preset triangular structure patterns.

In the step S3704, a view dependent component for texture map of a current view may be determined from view dependent component information.

According to an embodiment, the view dependent component information may include a view dependent component of a texture map for a plurality of captured view images. The view independent component may be determined from an average texture map of a texture map for the plurality of captured view images. The view dependent component of the texture map for the plurality of captured view images may be determined according to a difference value between the texture map for the plurality of captured view images and the view independent component.

According to an embodiment, a weight of the plurality of captured view images may be calculated according to the current view. According to the weight of the plurality of captured view images, a weighted average of view dependent components of the texture map of the plurality of captured view images may be calculated. According to the calculated weighted average, a view dependent component of texture map for the current view may be determined.

According to an embodiment, the weight may be determined according to a view angle difference and a view position difference between the current view and the plurality of captured view images.

In the step S3706, a texture map of a current view may be generated from a view independent component of view independent component information and a view dependent component for the current view.

In the step S3708, a current view image may be reconstructed according to a three-dimensional space that is configured according to a texture map of the current view and three-dimensional geometry information.

According to an embodiment, current view information for a current view may be obtained. The current view information may include the position information, rotation information, focus information and center pixel coordinate information of the current view.

According to an embodiment, according to the current view information, a two-dimensional coordinate of the texture map of the current and a three-dimensional coordinate of the three-dimensional space may be matched. According to the matched relation between the two-dimensional coordinate and the three-dimensional coordinate, the current view image may be reconstructed from the texture map of the current view.

Figure 38:
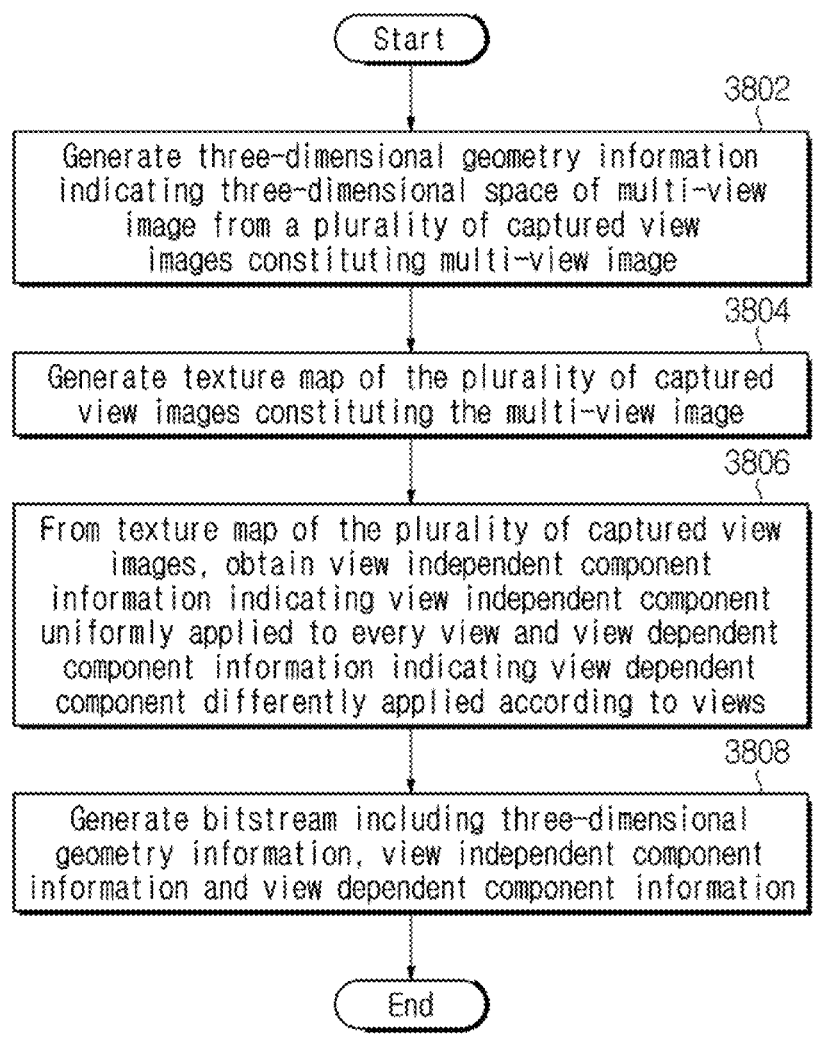
FIG. 38 illustrates a multi-view image encoding method according to an embodiment of the present disclosure.

FIG. 38 illustrates a multi-view image encoding method according to an embodiment of the present disclosure.

In the step S3802, three-dimensional geometry information indicating a three-dimensional space of a multi-view image is generated from a plurality of captured view images constituting the multi-view image.

According to an embodiment, the three-dimensional geometry information may indicate a triangular mesh structure representing a three-dimensional space. The three-dimensional geometry information may include at least one of vertex position information indicating three-dimensional positions of vertexes of a triangular mesh, connectivity information indicating geometric connection between the vertexes of the triangular mesh, and texture map position information indicating a two-dimensional position corresponding to a vertex of the triangular mesh.

According to an embodiment, the triangular mesh structure may be determined in voxel units of the three-dimensional space, and a triangular mesh structure for a voxel may be determined as one of a plurality of preset triangular structure patterns.

In the step S3804, a texture map of a plurality of captured view images constituting a multi-view image is generated.

According to an embodiment, capture view information of the plurality of captured view images may be obtained. The capture view information may include the position information, rotation information, focus information and center pixel coordinate information of the captured view images.

According to an embodiment, a two-dimensional coordinate of a texture map of the captured view image and a three-dimensional coordinate of the three-dimensional space may be matched according to the capture view information. According to the matched relation between the two-dimensional coordinate and the three-dimensional coordinate, a texture map of the plurality of captured view images may be generated from the plurality of captured view images.

In the step S3806, view independent component information indicating a view independent component, which is uniformly applied to every view, and view dependent component information indicating a view dependent component, which is differently applied according to views are obtained from a texture map of a plurality of captured view images.

According to an embodiment, the view dependent component information may include a view dependent component of a texture map for a plurality of captured view images. The view independent component may be determined from an average texture map of a texture map for the plurality of captured view images, and a view dependent component of a texture map for the plurality of captured view images may be determined according to a difference value between a texture map for the plurality of captured view images and the view independent component.

In the step S3808, a bitstream is generated which includes three-dimensional geometry information, view independent component information and view dependent component information.

The embodiments of FIG. 37 and FIG. 38 are exemplary, and each step of FIG. 37 and FIG. 38 may be readily modified by those skilled in the art. In addition, each configuration of FIG. 37 and FIG. 38 may be omitted or replaced by another configuration. In addition, one or more processors may execute commands implementing each step of FIG. 37 and FIG. 38. In addition, a program product including commands implementing each step of FIG. 37 and FIG. 38 may be stored in a memory device or be sold online. In addition, a bitstream that is generated according to the multi-view image encoding method of FIG. 38 and is decoded according to the multi-view image decoding method of FIG. 39 may be stored in a memory device or be distributed online.

In the above-described embodiments, the methods are described based on the flowcharts with a series of steps or units, but the present disclosure is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present disclosure.

The above-described embodiments include various aspects of examples. All possible combinations for various aspects may not be described, but those skilled in the art will be able to recognize different combinations. Accordingly, the present disclosure may include all replacements, modifications, and changes within the scope of the claims.

The embodiments of the present disclosure may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present disclosure, or well-known to a person of ordinary skilled in computer software technology field. Examples of the computer-readable recording medium include magnetic recording media such as hard disks, floppy disks and magnetic tapes; optical data storage media such as CD-ROMs and DVD-ROMs; magneto-optimum media like floptical disks; and hardware devices, such as read-only memory (ROM), random-access memory (RAM), flash memory, etc., which are particularly structured to store and implement program instructions. Examples of the program instructions include not only a mechanical language code formatted by a compiler but also a high-level language code that may be implemented by a computer using an interpreter. The hardware devices may be configured to be operated by one or more software modules or vice versa to conduct the processes according to the present disclosure.

Although the present disclosure has been described in terms of specific items such as detailed elements as well as the limited embodiments and the drawings, they are only provided to help more general understanding of the disclosure, and the present disclosure is not limited to the above embodiments. It will be appreciated by those skilled in the art to which the present disclosure pertains that various modifications and changes may be made from the above description.

Therefore, the spirit of the present disclosure shall not be limited to the above-described embodiments, and the entire scope of the appended claims and their equivalents will fall within the scope and spirit of the disclosure.

The invention claimed is:

1. A multi-view image decoding method, the method comprising:
    obtaining, from a bitstream, three-dimensional geometry information indicating a three-dimensional space of a multi-view image, view independent component information indicating a view independent component, which is uniformly applied to every view, and view dependent component information indicating a view dependent component, which is differently applied according to views;
    determining the view dependent component for a texture map of a current view from the view dependent component information;
    generating the texture map of the current view from the view independent component of the view independent component information and the determined view dependent component for the current view; and
    reconstructing a current view image according to the texture map of the current view and the three-dimensional space that is constructed according to the three-dimensional geometry information,
    wherein the three-dimensional space is defined by a triangular mesh structure in the unit of voxels, the triangular mesh structure for each voxel set as one among a plurality of pre-determined triangular mesh structure pattern candidates,
    wherein the three-dimensional geometry information is index information for indicating the triangular mesh structure for each voxel from among the plurality of pre-determined triangular mesh structure pattern candidates, and
    at least some of the plurality of pre-determined triangular mesh structure pattern candidates are defined at least based on preset UV locations.

2. The multi-view image decoding method of claim 1, wherein the view dependent component information comprises the view dependent component of a texture map for a plurality of captured view images.

3. The multi-view image decoding method of claim 2, wherein the determining of the view dependent component for the current view from the view dependent component information comprises:
    determining weights of the plurality of captured view images according to the current view;
    calculating a weighted average of view dependent components of the texture map for the plurality of captured view images according to the weights of the plurality of captured view images; and
    determining a view dependent component of the texture map for the current view according to the calculated weighted average.

4. The multi-view image decoding method of claim 3, wherein the weights of the plurality of the captured view images according to the current view are determined according to a view angle difference and a view position difference between the current view and each of the plurality of captured view images.

5. The multi-view image decoding method of claim 2,
wherein the view independent component is determined from an average texture map of texture maps for the plurality of captured view images, and
wherein the view dependent component of the texture map for the plurality of captured view images is determined according to a difference value between a texture value of the texture map for the plurality of captured view images and a component value of the view independent component.

6. The multi-view image decoding method of claim 1 further comprises
obtaining current view information for the current view, wherein the current view information comprises position information, rotation information, focus information and center pixel coordinate information of the current view.

7. The multi-view image decoding method of claim 6,
wherein the reconstructing of the current view image comprises:
matching a two-dimensional coordinate of the texture map of the current view and a three-dimensional coordinate of the three-dimensional space according to the current view information; and
reconstructing the current view image from the texture map of the current view according to the matched relation between the two-dimensional coordinate and the three-dimensional coordinate.

8. A multi-view image encoding method, the method comprising:
generating, from a plurality of captured view images constituting a multi-view image, three-dimensional geometry information indicating a three-dimensional space of the multi-view image;
generating a texture map of the plurality of captured view images constituting the multi-view image;
obtaining, from the texture map of the plurality of captured view images, view independent component information indicating a view independent component, which is uniformly applied to every view, and view dependent component information indicating a view dependent component, which is differently applied according to views; and
generating a bitstream comprising the three-dimensional geometry information, the view independent component information and the view dependent component information,
wherein the three-dimensional space is defined by a triangular mesh structure in the unit of voxels, the triangular mesh structure for each voxel set as one among a plurality of pre-determined triangular mesh structure pattern candidates,
wherein the three-dimensional geometry information is index information for indicating the triangular mesh structure for each voxel from among the plurality of pre-determined triangular mesh structure pattern candidates, and
wherein at least some of the plurality of pre-determined triangular mesh structure pattern candidates are defined at least based on preset UV locations.

9. The multi-view image encoding method of claim 8,
wherein the view dependent component information comprises the view dependent component of a texture map for a plurality of captured view images.

10. The multi-view image encoding method of claim 9,
wherein the view independent component is determined from an average texture map of a texture map for the plurality of captured view images, and
wherein a view dependent component of the texture map for the plurality of captured view images is determined according to a difference value between the texture map for the plurality of captured view images and the view independent component.

11. The multi-view image encoding method of claim 8,
wherein the generating of the texture map of the plurality of captured view images constituting the multi-view image further comprises obtaining capture view information of the plurality of captured view images, and
wherein the capture view information comprises position information, rotation information, focus information and center pixel coordinate information of the captured view images.

12. The multi-view image encoding method of claim 11,
wherein the generating of the texture map of the plurality of captured view images constituting the multi-view image comprises:
matching a two-dimensional coordinate of the texture map of the captured view images and a three-dimensional coordinate of the three-dimensional space according to the capture view information; and
generating the texture map of the plurality of captured view images from the plurality of captured view images according to the matched relation between the two-dimensional coordinate and the three-dimensional coordinate.

13. A non-transitory computer-readable recording medium for storing a bitstream comprising coded data of a multi-view image that is encoded according to a multi-view image encoding method,
wherein the multi-view image encoding method comprises:
generating, from a plurality of captured view images constituting a multi-view image, three-dimensional geometry information indicating a three-dimensional space of the multi-view image;
generating a texture map of the plurality of captured view images constituting the multi-view image;
obtaining, from the texture map of the plurality of captured view images, view independent component information indicating a view independent component, which is uniformly applied to every view, and view dependent component information indicating a view dependent component, which is differently applied according to views; and
generating a bitstream comprising the three-dimensional geometry information, the view independent component information and the view dependent component information,
wherein the three-dimensional space is defined by a triangular mesh structure in the unit of voxels, the triangular mesh structure for each voxel set as one among a plurality of pre-determined triangular mesh structure pattern candidates,
wherein the three-dimensional geometry information is index information for indicating the triangular mesh structure for each voxel from among the plurality of pre-determined triangular mesh structure pattern candidates, and
wherein at least some of the plurality of pre-determined triangular mesh structure pattern candidates are defined at least based on preset UV locations.

* * * * *